(12) United States Patent
Matsuki

(10) Patent No.: US 11,146,700 B2
(45) Date of Patent: Oct. 12, 2021

(54) IMAGE FORMING APPARATUS AND COMMUNICATION SYSTEM THAT UTILIZE GROUP CHAT FUNCTION

(71) Applicant: KYOCERA Document Solutions Inc., Osaka (JP)

(72) Inventor: Yoshitaka Matsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/151,231

(22) Filed: Jan. 18, 2021

(65) Prior Publication Data
US 2021/0234978 A1 Jul. 29, 2021

(30) Foreign Application Priority Data

Jan. 27, 2020 (JP) .............................. JP2020-011211
Jan. 27, 2020 (JP) .............................. JP2020-011212

(51) Int. Cl.
| | |
|---|---|
| *G06F 3/12* | (2006.01) |
| *H04N 1/00* | (2006.01) |
| *G06F 40/263* | (2020.01) |
| *G06F 8/61* | (2018.01) |
| *H04L 12/58* | (2006.01) |

(52) U.S. Cl.
CPC .......... *H04N 1/00498* (2013.01); *G06F 8/62* (2013.01); *G06F 40/263* (2020.01); *H04L 51/046* (2013.01); *H04N 1/00307* (2013.01); *H04N 1/00501* (2013.01)

(58) Field of Classification Search
None
See application file for complete search history.

(56) References Cited

U.S. PATENT DOCUMENTS

| | | | |
|---|---|---|---|
| 2013/0091443 A1* | 4/2013 | Park ..................... | G06F 3/04883 715/758 |
| 2015/0172505 A1* | 6/2015 | Park ..................... | H04N 1/00307 358/1.15 |
| 2018/0174222 A1* | 6/2018 | Venkatakrishnan .... | H04L 51/02 |
| 2018/0227251 A1 | 8/2018 | Takishima et al. | |
| 2018/0276202 A1* | 9/2018 | Baek ..................... | H04L 51/046 |
| 2020/0133592 A1* | 4/2020 | Mitsuhashi ........... | G06F 3/1254 |
| 2020/0252357 A1 | 8/2020 | Takishima et al. | |

FOREIGN PATENT DOCUMENTS

| | | |
|---|---|---|
| JP | 2006-026972 A | 2/2006 |
| JP | 2018-128843 A | 8/2018 |

* cited by examiner

*Primary Examiner* — Henok Shiferaw
(74) *Attorney, Agent, or Firm* — IP Business Solutions, LLC

(57) ABSTRACT

An image forming apparatus includes a setup unit, a language identification unit, and a controller. The setup unit establishes a condition that enables group chat to be performed, among the image forming apparatus and a plurality of information processing apparatuses, by activating a group chat tool. The language identification unit identifies, when a communication device receives a message inputted to the group chat from the information processing apparatus, a language of the message. When the language identified by the language identification unit is not installed, the controller retrieves language data indicating the identified language from a storage device, and installs the identified language as a language usable with the image forming apparatus.

20 Claims, 28 Drawing Sheets

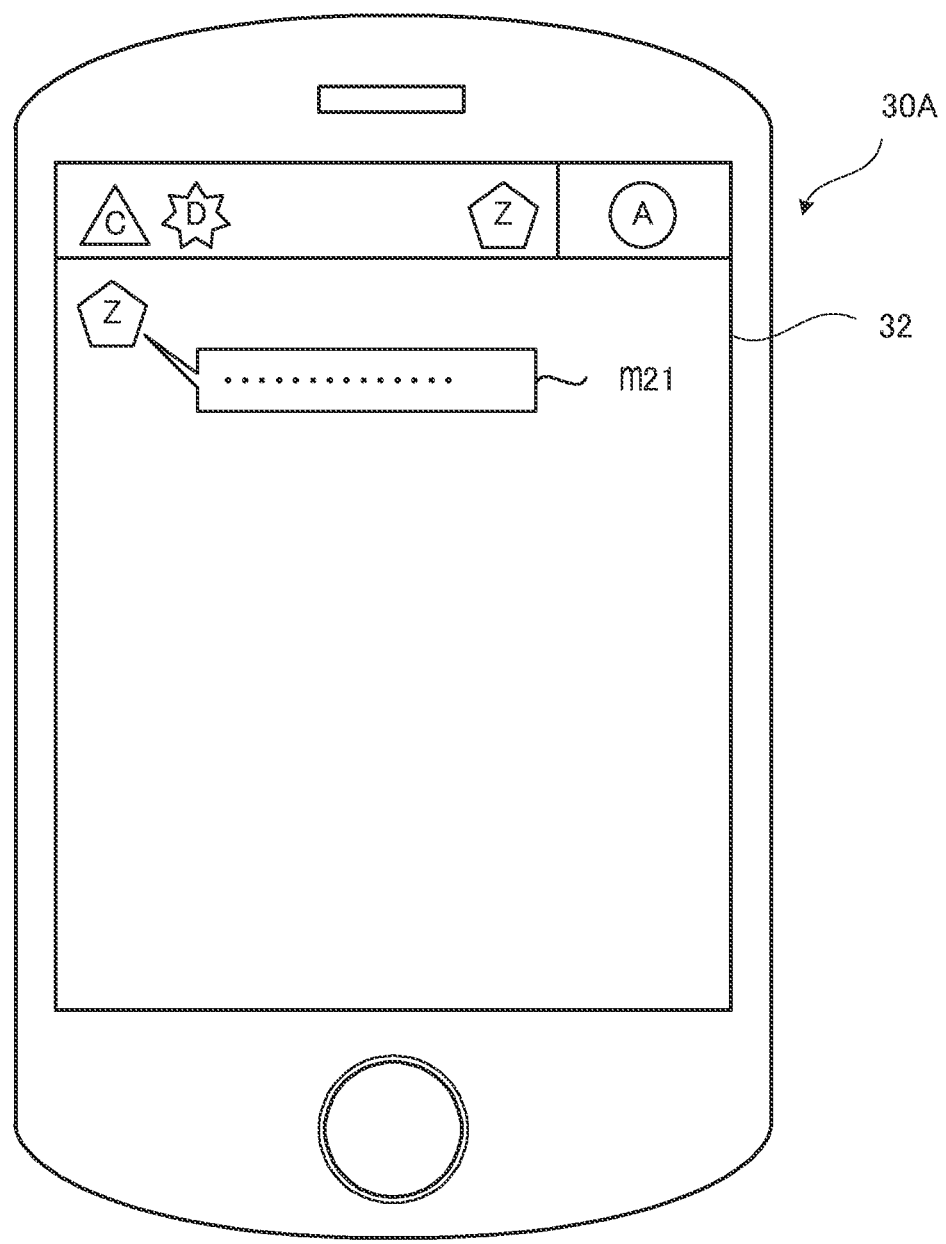

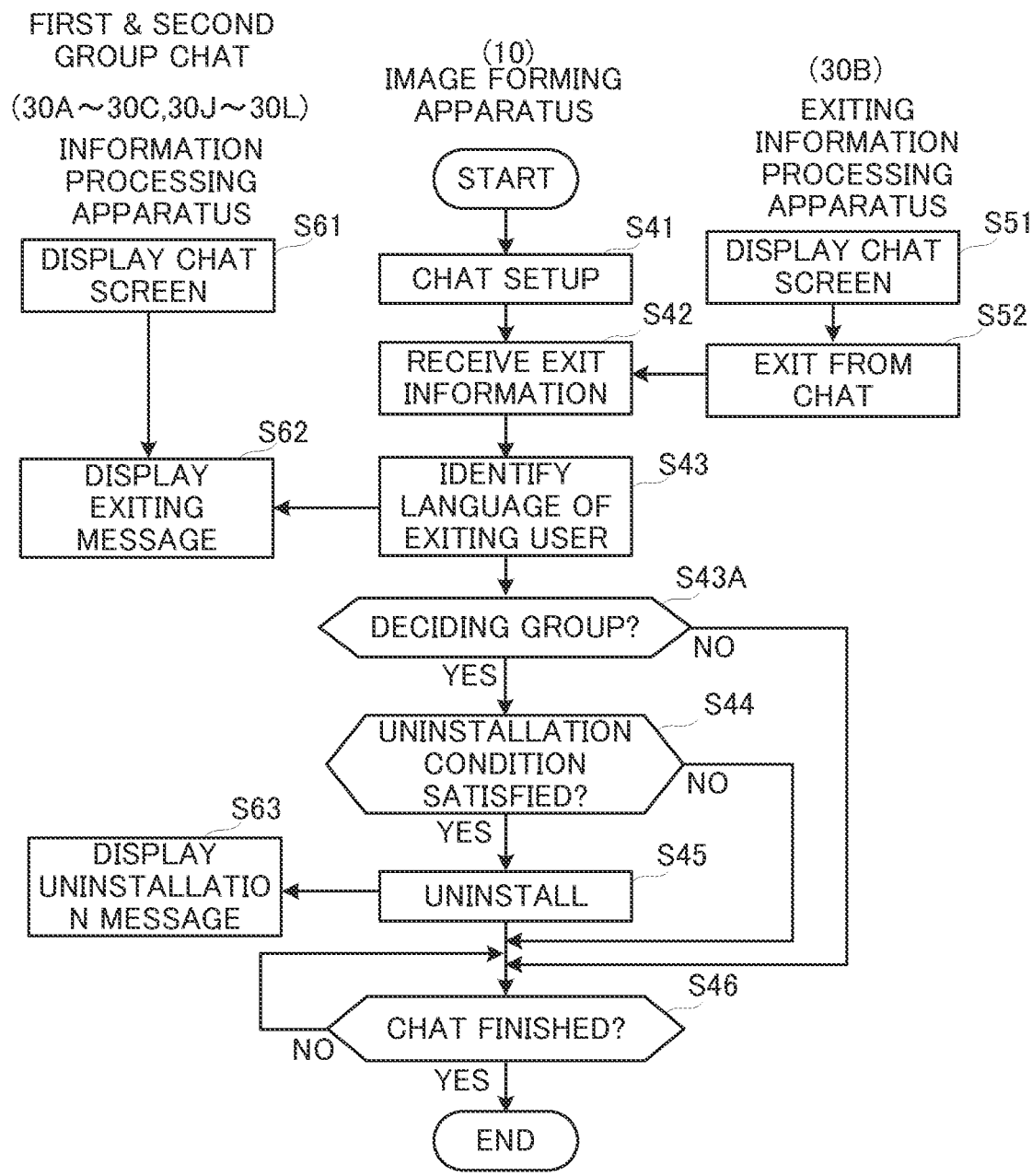

IMAGE FORMING APPARATUS AND COMMUNICATION SYSTEM THAT UTILIZE GROUP CHAT FUNCTION

INCORPORATION BY REFERENCE

This application claims priority to Japanese Patent Application No. 2020-011211, and No. 2020-011212 filed on Jan. 27, 2020, the entire contents of which are incorporated by reference herein.

BACKGROUND

The present disclosure relates to an image forming apparatus and a communication system, and in particular to a technique that utilizes a group chat function.

A first example of existing image forming apparatuses is configured to retrieve, when a user operating the image forming apparatus undergoes fingerprint authentication, language identification information associated with personal authentication data such as the fingerprint, from a personal information registration table, and switch the language to be used for an operation screen or printing of a report, to the language indicated by the language identification information. Therefore, the operation guide can be presented to the user in the language familiar to the user currently using the image forming apparatus.

A second example of existing systems includes a chat service server, a plurality of user terminals, and a printer, the plurality of user terminals and the printer being connected to a chat service server via a network, so that a message such as a printing request can be transmitted from the user terminal to the printer, using the chat function. Therefore, the labor of operation can be saved.

SUMMARY

The disclosure proposes further improvement of the foregoing technique.

In an aspect, the disclosure provides an image forming apparatus including an image forming device, a communication device, a storage device, and a first control device. The image forming device forms an image on a recording medium. The communication device performs data communication. The storage device contains a plurality of predetermined language data. The first control device includes a processor, and acts as a setup unit, a language identification unit, and a controller, when the processor executes a control program. The setup unit establishes, by activating a group chat tool, a condition that enables group chat to be performed, among members including the image forming apparatus and a plurality of information processing apparatuses. The language identification unit identifies, when the communication device receives a message inputted to the group chat from the information processing apparatus, a language of the message. The controller installs the language indicated by the language data retrieved from the storage device, as a language usable with the image forming apparatus. When the language identified by the language identification unit is not installed, the controller retrieves the language data indicating the identified language from the storage device, and installs the identified language as a language usable with the image forming apparatus.

In another aspect, the disclosure provides a communication system including an image forming apparatus and a plurality of information processing apparatuses, the image forming apparatus and the plurality of information processing apparatuses being configured to perform data communication with each other via a network. The plurality of information processing apparatuses each include a display device, an operation device, a first communication device, and a first control device. The operation device is to be operated by a user. The first communication device performs data communication. The first control device includes a processor, and acts as a first setup unit, and a first controller, when the processor executes a control program. The first setup unit establishes a condition that enables group chat to be performed, by activating a group chat tool, and causes the display device to display a group chat screen. When a message is inputted to the group chat screen through the operation device, the first controller causes the first communication device to transmit the message to the image forming apparatus, via a network. The image forming apparatus includes an image forming device, a second communication device, a storage device, and a second control device. The image forming device forms an image on a recording medium. The second communication device performs data communication. The storage device contains a plurality of predetermined language data. The second control device includes a processor, and acts as a second setup unit, a language identification unit, and a second controller, when the processor executes a second control program. The second setup unit establishes a condition that enables group chat to be performed, by activating a group chat tool. The language identification unit identifies, when the second communication device receives the message from the plurality of information processing apparatuses, a language of the message. The second controller installs the language indicated by the language data retrieved from the storage device, as a language usable with the image forming apparatus. When the language identified by the language identification unit is not installed, the second controller retrieves language data indicating the identified language from the storage device, and installs the identified language as a language usable with the image forming apparatus.

BRIEF DESCRIPTION OF THE DRAWINGS

FIG. 9A and FIG. 9B are schematic drawings each showing an example of the screen displayed on the display device of the information processing apparatus;

FIG. 22 is a flowchart showing a process of deleting a language, using the group chat function of the communication system according to a fourth embodiment.

DETAILED DESCRIPTION

Hereafter, a communication system according to an embodiment of the disclosure will be described, with reference to the drawings.

Figure 1:
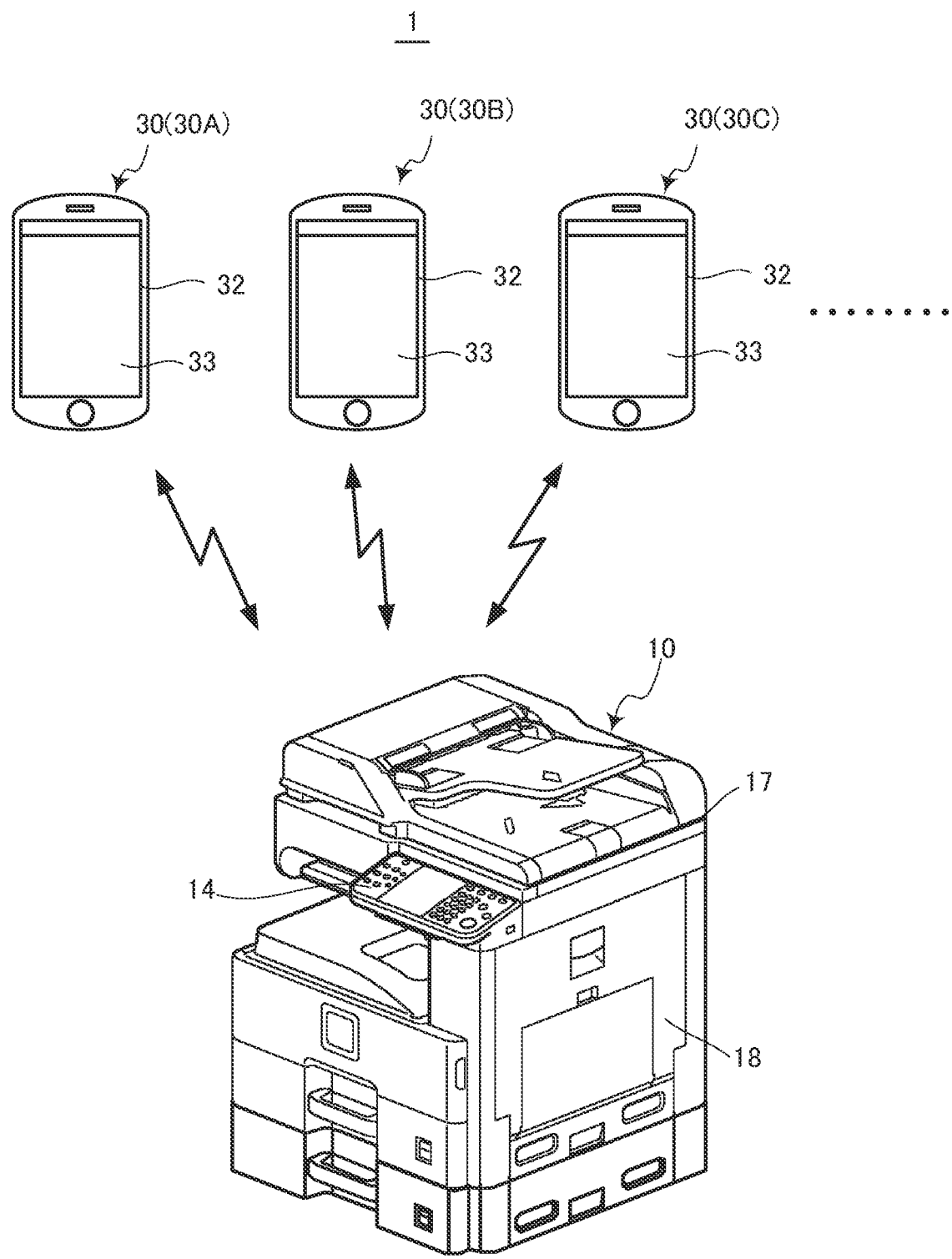
FIG. 1 is a perspective view showing the appearance of an image forming apparatus and an information processing apparatus, in a communication system according to a first embodiment of the disclosure.
Figure 2:
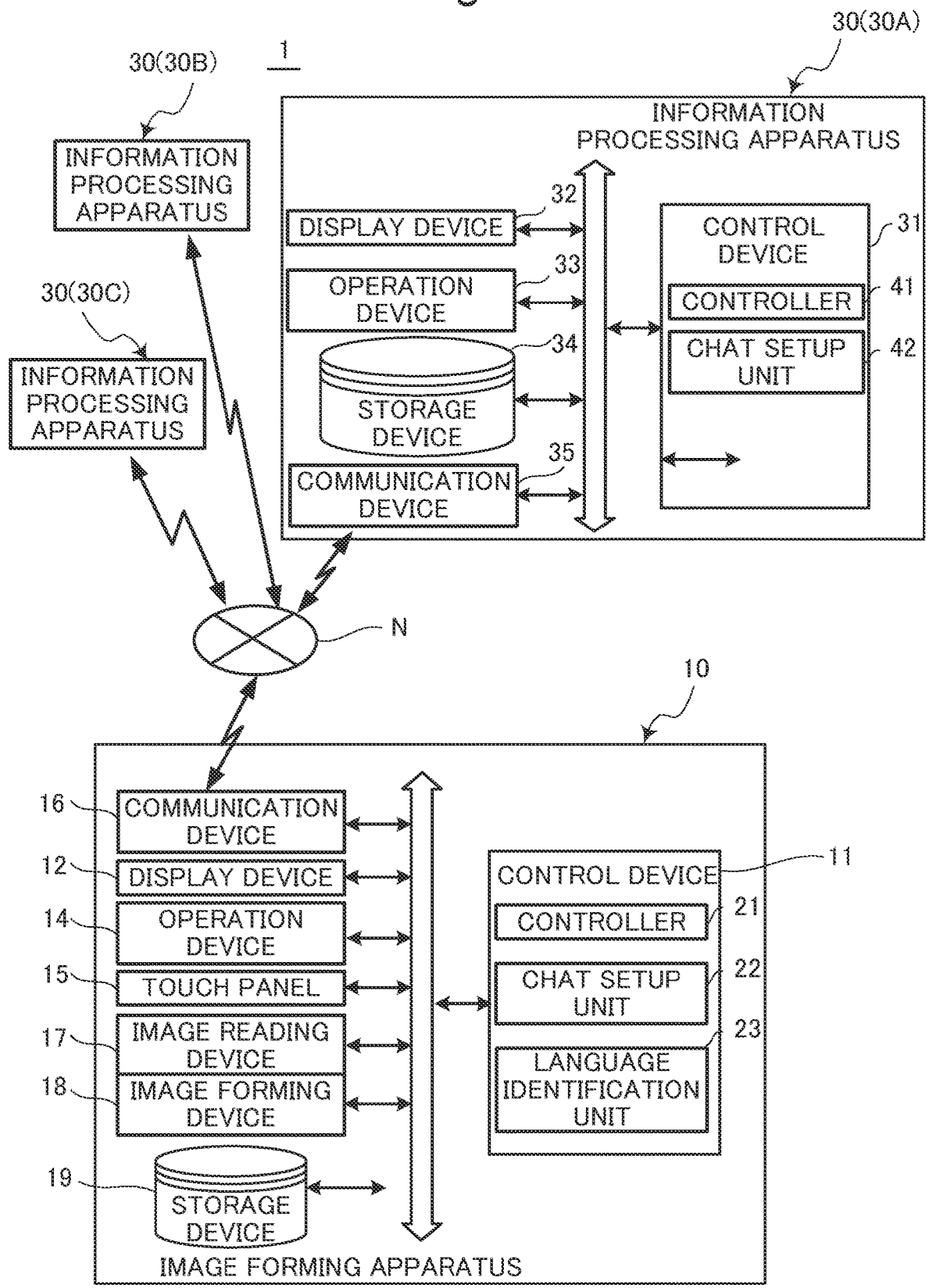
FIG. 2 is a block diagram showing a configuration of the image forming apparatus and the information processing apparatus, in the communication system according to the first embodiment.

FIG. 1 is a perspective view showing the appearance of an image forming apparatus and an information processing apparatus, in the communication system according to a first embodiment of the disclosure. FIG. 2 is a block diagram showing a configuration of the image forming apparatus and the information processing apparatus, in the communication system according to the first embodiment.

The communication system 1 according to the first embodiment includes the image forming apparatus 10 and a plurality (in the first embodiment, three) of information processing apparatuses 30, which perform data communication using a group chat tool with each other.

The information processing apparatus 30 is, for example, a personal computer, a tablet terminal, or a laptop personal computer, and includes a control device 31, a display device 32, an operation device 33, and a communication device (first communication device) 35. The mentioned components are configured to transmit and receive data or signals to and from each other, via a bus.

The display device 32 is, for example, constituted of a liquid crystal display (LCD) or an organic light-emitting diode (OLED) display.

The operation device 33 is an input device including a keyboard, a pointing device, and so forth.

The communication device 35 is a communication interface including a communication module, and performs data communication through a network N including a LAN and the public telephone network.

The storage device 34 is a large-capacity storage device such as a hard disk drive (HDD).

The control device 31 includes a processor, a random-access memory (RAM), and a read-only memory (ROM). The processor is, for example, a central processing device (CPU), a micro processing device (MPU), or an application specific integrated circuit (ASIC). The control device 31 acts as a controller 41 (first controller) and a chat setup unit 42 (first setup unit), when the processor executes a first control program stored in the storage device 34. Here, the mentioned components of the control device 31 may each be constituted in the form of a hardware circuit, instead of being realized by the operation according to the control program.

The controller 41 serves to control the overall operation of the information processing apparatus 30.

The controller 41 identifies a user operation inputted by the user through the operation device 33. The controller 41 then receives the user operation identified.

The controller 41 controls the display device 32 so as to display various types of windows, items necessary for information processing, texts, and so forth, on the screen of the display device 32.

The controller 41 is configured to control the communication performance of the communication device 35. For example, the communication device 35 transmits and receives data to and from the image forming apparatus 10 through a LAN, under the control of the controller 41.

When the operation device 33 receives a group chat activating operation performed by the user, the controller 41 instructs the chat setup unit 42 to activate the group chat tool.

Figure 6A:
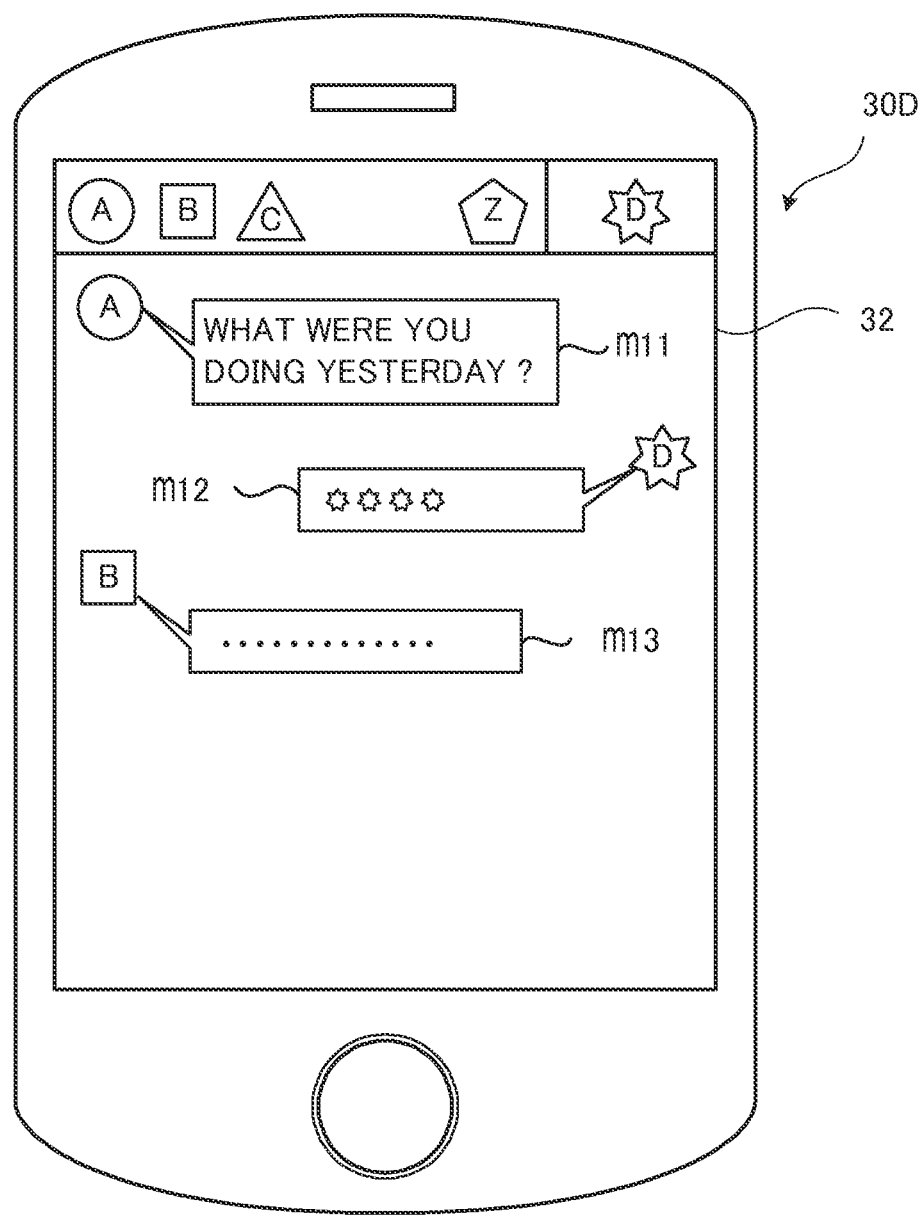
FIG. 6A and FIG. 6B are schematic drawings each showing an example of the screen displayed on the display device of the information processing apparatus.
Figure 6B:
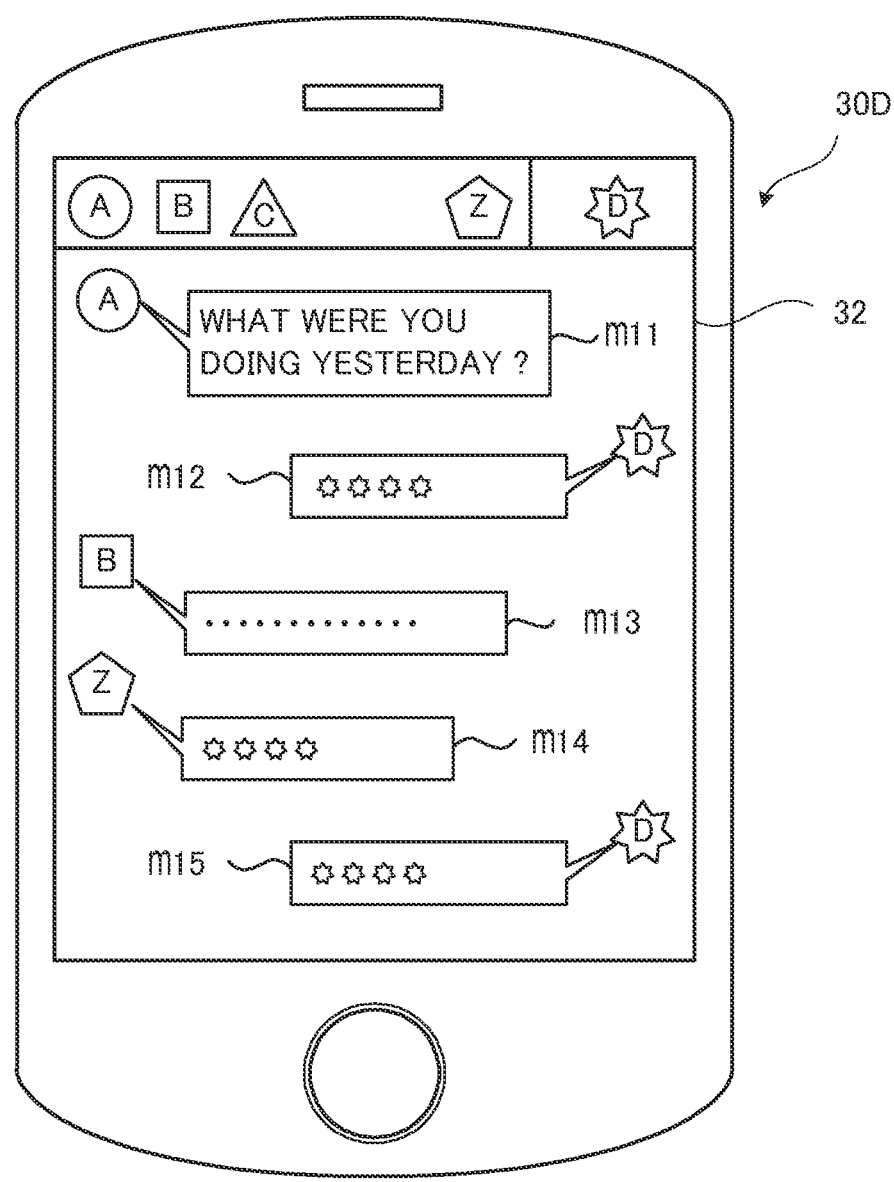

The chat setup unit 42 establishes a group chat IP communication function, by activating the group chat tool, in other words by executing a group chat application program. As result, a condition that enables the chat to be performed is established. The chat setup unit 42 causes the display device 32 to display a group chat screen, as shown in FIGS. 6A and 6B to be subsequently referred to. The group chat application program is installed in the storage device 34.

The controller 41 transmits and receives data to and from the terminal device of the communication counterpart (e.g., image forming apparatus 10 or other information processing apparatus 30), through the communication device 35, utilizing the group chat IP communication function. For example, when message information is inputted to the group chat screen through the operation device 33, the controller 41 transmits the message information to the image forming apparatus 10, through the communication device 35, via the network N.

The image forming apparatus 10 includes a control device 11, a display device 12, an operation device 14, a touch panel 15, a communication device (second communication device) 16, an image reading device 17, an image forming device 18, and a storage device 19. The mentioned components are configured to transmit and receive data or signals to and from each other, via a bus.

The image reading device 17 is a reading mechanism including a scanner that optically reads a source document, and generates image data representing the image of the source document.

The image forming device 18 uniformly charges the surface of a photoconductor drum, forms an electrostatic latent image on the surface of the photoconductor drum by exposing the same to light, develops the electrostatic latent image on the surface of the photoconductor drum into a toner image, transfers the toner image on the photoconductor drum to a recording sheet (recording medium), and fixes the image thereon. For example, the image forming device 18 can print, under the control of a controller 21, an image represented by a print job received by the communication device 16 on the recording sheet, or print an image represented by the image data generated by the image reading device 17, on the recording sheet.

The display device 12 is, for example, constituted of a liquid crystal display or an organic light-emitting diode display.

A touch panel 15 is overlaid on the screen of the display device 12. The touch panel 15 is based on a resistive film or electrostatic capacitance, and configured to detect a contact (touch) of the user's finger, along with the touched position, and outputs a detection signal indicating the coordinate of the touched position, to the controller 21 of the control device 11 to be subsequently described. Thus, the touch panel 15 serves as an operation device for receiving an input made by the user through the screen of the display device 12.

The operation device 14 includes, for example, a menu key for displaying a menu, arrow keys for moving the focus in the GUI constituting the menu, an enter key for confirming a selection to the GUI constituting the menu, and a start key.

The communication device 16 is a communication interface including a communication module, and performs data communication through a network N including a LAN and the public telephone network.

The storage device 19 is a large-capacity storage device such as a HDD. The storage device 19 contains data of a predetermined plurality of languages. The predetermined plurality of languages include, for example, English, Japanese, German, French, Chinese, Korean, Russian, Arabian, and Hebrew.

The control device 11 includes a processor, a RAM, and a ROM. The processor is, for example, a CPU, an MPU, or an ASIC. The control device 11 acts as the controller 21 (second controller), a chat setup unit 22 (setup unit, second setup unit), and a language identification unit 23, when the processor executes a second control program stored in the storage device 19. Here, the mentioned components of the control device 11 may each be constituted in the form of a hardware circuit, instead of being realized by the operation according to the second control program.

The controller 21 serves to control the overall operation of the image forming apparatus 10.

The controller 21 receives a user operation performed on the touch panel 15, on the basis of a detection signal outputted from the touch panel 15. The controller 21 also receives the user operation performed on the hard keys of the operation device 14.

The controller 21 controls the display device 12, so as to display a screen for inputting setting details necessary for the image forming operation, and a screen for inputting various types of information.

The controller 21 is configured to control the communication performance of the communication device 16. For example, the communication device 16 transmits and receives data to and from the information processing apparatus 30 through a LAN, under the control of the controller 21. The controller 21 also installs a language indicated by the language data retrieved from the storage device 19, as a language that the image forming apparatus 10 can accept.

The chat setup unit 22 establishes a group chat IP communication function, by activating the group chat tool, in other words by executing the group chat application program. As result, a condition that enables the group chat to be performed is established. Although the chat setup unit 22 may allow the display device 12 to display a group chat screen shown in FIG. 6A and FIG. 6B to be subsequently referred to, the display device 12 is restricted from doing so, in this embodiment. The group chat application program is installed in the storage device 19. The controller 21 transmits and receives data to and from a terminal device of the communication counterpart (e.g., information processing apparatus 30) through the communication device 16, utilizing the group chat IP communication function.

The language identification unit 23 identifies the language of a message, when the communication device 16 receives the message inputted to the group chat, from the information processing apparatus 30. For example, the language identification unit 23 identifies the type of the language of the character expressed by the character text of the message from the information processing apparatus 30, using a known language identification technique. More specifically, the message includes the character text representing the content of the message, and information of character code type accompanying the message (information indicating the language). Accordingly, the language identification unit 23 identifies the type of the language of the character expressed by the character text of the message, on the basis of the information of the character code type accompanying the message. Alternatively, the language identification unit 23 may identify the language of the message, through a pattern matching process with respect to the character text of the message from the information processing apparatus 30.

When the language identified by the language identification unit 23 is not installed, the controller 21 retrieves the language data indicating the identified language from the storage device 19, and installs the identified language, as the language usable with the image forming apparatus 10.

Here, the image forming apparatus 10 includes a non-illustrated real-time clock (RTC), and the controller 21 can acquire the current time from the RTC.

Between the image forming apparatus 10 and the plurality of information processing apparatuses 30, messages can be transmitted from the information processing apparatus 30 to the image forming apparatus 10, and messages responding to the received message can be transmitted from the image forming apparatus 10 to the terminal device of the communication counterpart (e.g., information processing apparatus 30), using a communication function such as an internet phone service based on the P2P technique, or a social network service. In this embodiment, such communication function will be referred to as IP communication function. An example of the IP communication function is the known Skype (registered trademark). In the case of the Skype, apparatus identification information (e.g., ID and password) for identifying the apparatus is registered with respect to each of the image forming apparatus 10 and the plurality of information processing apparatuses 30, so that the chat, phone call, image data transmission can be performed among the image forming apparatus 10 and the plurality of information processing apparatuses 30, when the Skype is activated in the apparatus.

The controller 41 of the information processing apparatus 30 causes the communication device 35 to transmit chat-related information, such as entry information indicating that the information processing apparatus 30 has joined the chat, and exit information indicating that the information processing apparatus 30 has left the chat, to the image forming apparatus 10 via the network N. The controller 41 of the information processing apparatus 30 causes the communication device 35 to also transmit status information, indicating which state the information processing apparatus 30 is in, being communicable, unable to respond, or temporarily absent, to the image forming apparatus 10 via the network N.

When the group chat is established in the information processing apparatus 30, the status of the information processing apparatus 30 is normally displayed so as to indicate that the user of the information processing apparatus 30 can be reached, in other words that the user is communicable. When the user is operating the operation device 33, or when an error has occurred in the information processing apparatus 30, the status of the information processing apparatus 30 is displayed so as to indicate that the information processing apparatus 30 is unable to respond. When the user has not touched the operation device 33 for a certain period, the status of the information processing apparatus 30 is displayed so as to indicate that the user is temporarily absent.

Figure 3:
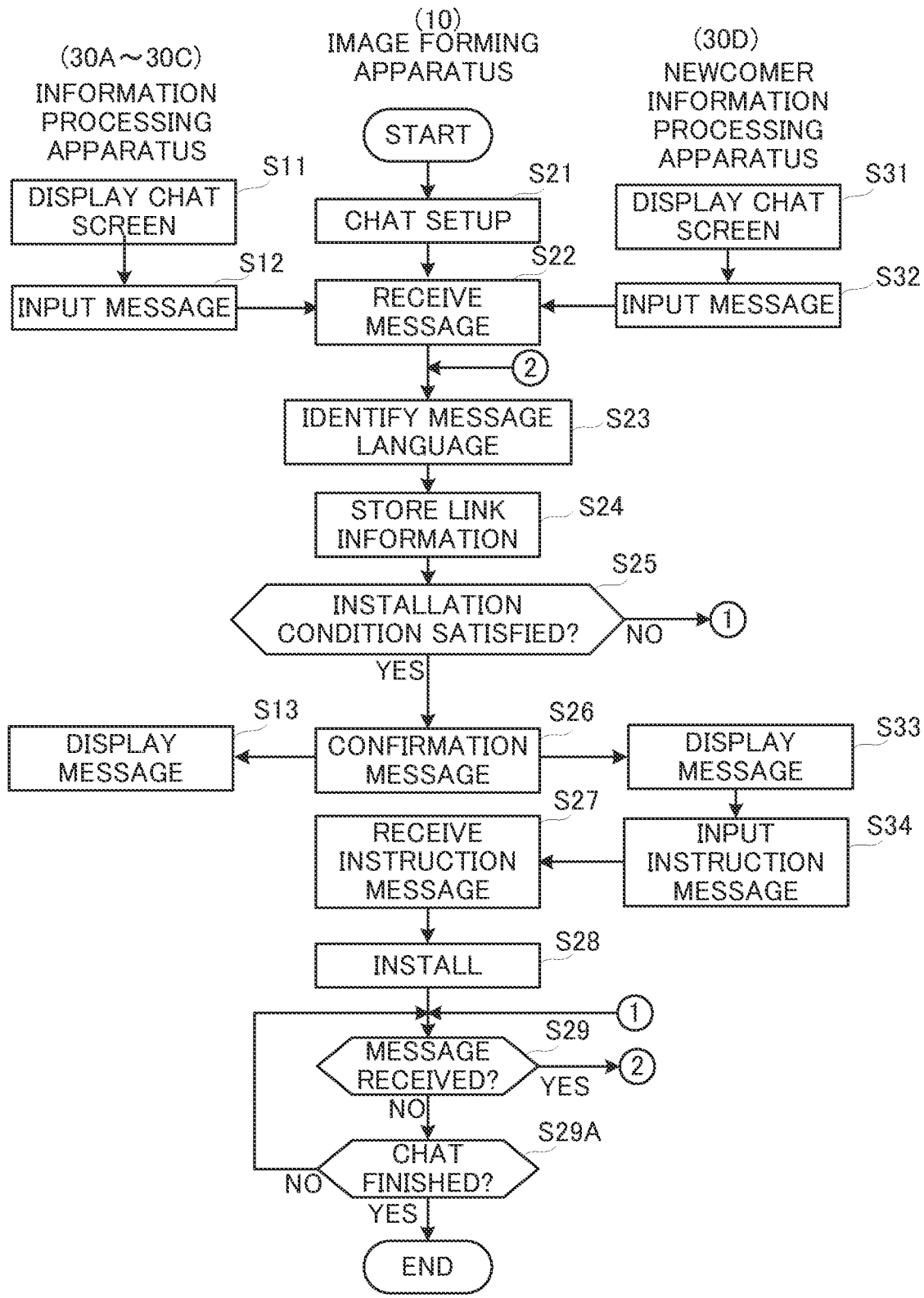
FIG. 3 is a flowchart showing a process to add a language by using a group chat function, in the communication system according to the first embodiment.

Hereunder, a process to add a language using the group chat function, in the communication system 1 according to the first embodiment, will be described with reference to FIG. 3. FIG. 3 is a flowchart showing the process to add a language by using the group chat function, in the communication system according to the first embodiment.

Figure 4A:
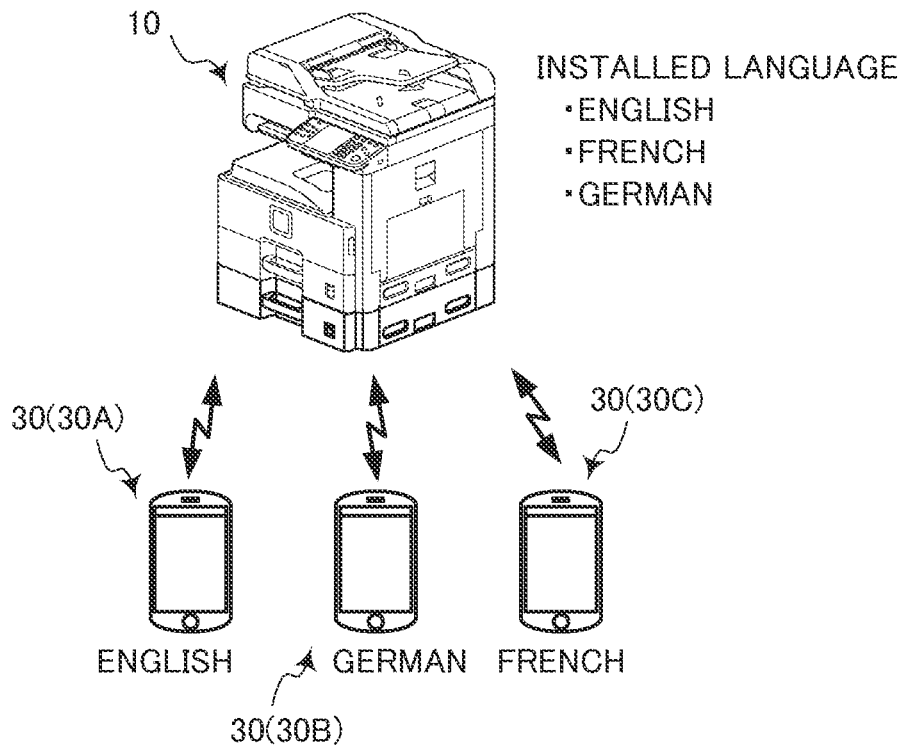
FIG. 4A is a schematic drawing showing a state where the image forming apparatus and three information processing apparatuses are performing group chat.
Figure 4B:
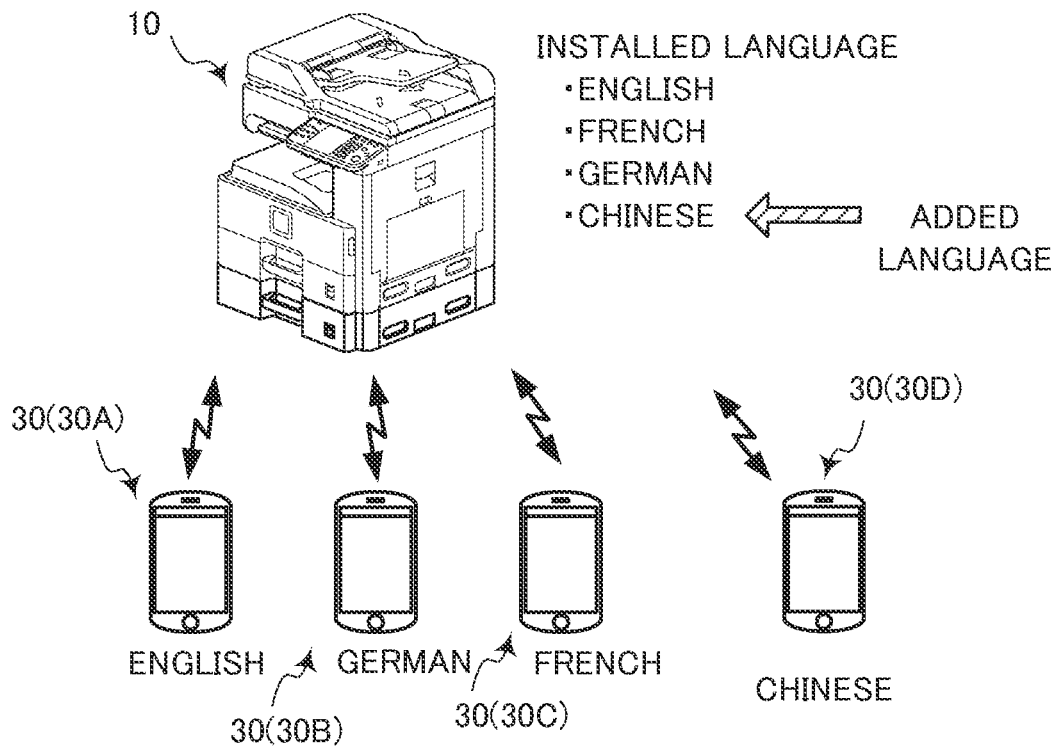
FIG. 4B is a schematic drawing showing a state where a language is added by a message from an information processing apparatus that has newly joined the chat.
Figure 5:
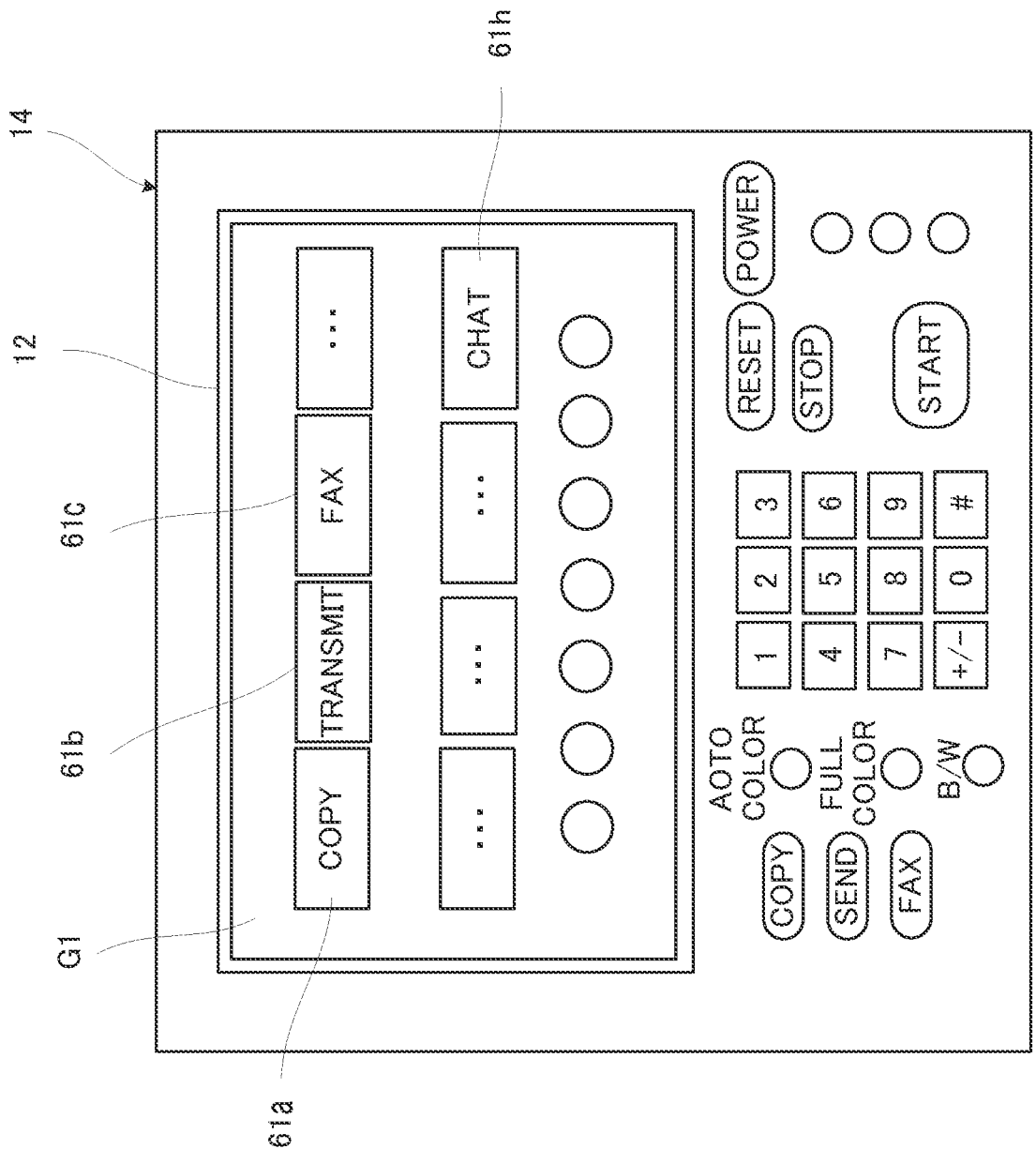
FIG. 5 is a plan view showing an operation device and a display device of the image forming apparatus.

The description given hereunder refers to an example where, as shown in FIG. 4A to FIG. 6B, a language is added on the basis of a message outputted by an information processing apparatus that has newly joined the chat. FIG. 4A is a schematic drawing showing a state where the image forming apparatus and three information processing apparatuses are performing the group chat. FIG. 4B is a schematic drawing showing a state where a language is added on the basis of a message from an information processing apparatus that has newly joined the chat. FIG. 5 is a plan view showing the operation device and the display device of the image forming apparatus. FIG. 6A and FIG. 6B are schematic drawings each showing an example of the screen displayed on the display device of the information processing apparatus. It will be assumed here that English, German, and French are already installed, as the languages usable with the image forming apparatus 10, as shown in FIG. 4A.

First, the chat setup unit 22 of the image forming apparatus 10 activates the group chat tool, thereby establishing the group chat IP communication function (S21).

More specifically, the controller 21 causes the display device 12 to display a menu screen G1 shown in FIG. 5, in advance. The menu screen G1 includes a plurality of touch keys 61*a* to 61*h*, respectively associated with the functions of the image forming apparatus 10. When the user touches the touch key 61*h* associated with the chat function, the touch panel 15 detects the touch on the touch key 61*h*, and this touch operation is received by the controller 21. The controller 21 instructs the chat setup unit 22 to activate the group chat tool, so that the chat setup unit 22 establishes the group chat IP communication function (S21).

It is assumed here that the operation device 33 of each of, for example, three information processing apparatuses 30 as shown in FIG. 4A, has received the instruction of the user to activate the group chat function. Accordingly, the controller 41 instructs the chat setup unit 42 to activate the group chat tool, according to activating operation. The chat setup unit 42 establishes the group chat IP communication function according to the instruction of the controller 41, and causes the display device 32 to display the group chat screen (S11).

For the description of the first embodiment, the three information processing apparatuses 30 will be referred to as information processing apparatus 30A, 30B, and 30C, for the sake of clarity. The information processing apparatuses 30A to 30C are terminal devices owned by the users who use English, German, and French, respectively, in the group chat.

It is also assumed here that the operation device 33 of a fourth information processing apparatus 30D shown in FIG. 4B has received the instruction of the user to activate the group chat function. Accordingly, the controller 41 instructs the chat setup unit 42 to activate the group chat tool, according to activating operation. The chat setup unit 42 establishes the group chat IP communication function according to the instruction of the controller 41, and causes the display device 32 to display the group chat screen shown in FIG. 6A (S31).

In the first embodiment, the fourth information processing apparatus 30D is the terminal device owned by the user who uses Chinese in the group chat. The controller 21 of the image forming apparatus 10 recognizes, when the communication device 16 receives the entry information from the information processing apparatuses 30A to 30D, that the information processing apparatuses 30A to 30D are included in the member of the group chat.

In an upper-end display section of the group chat screen shown in FIG. 6A, icons respectively representing the members of the group chat, namely the information processing apparatuses 30A, 30B, 30C, and 30D, and the image forming apparatus 10, are displayed. The icon expressed as A inside a circle represents the information processing apparatus 30A, the icon expressed as B inside a square represents the information processing apparatus 30B, the icon expressed as C inside a triangle represents the information processing apparatus 30C, the icon expressed as D inside a star represents the information processing apparatus 30D, and the icon expressed as Z inside a pentagon represents the image forming apparatus 10.

When a message m11 written in English from the user of the information processing apparatus 30A is inputted to the group chat screen, by the user thereof (S12), the controller 41 of the information processing apparatus 30A causes the communication device 35 to transmit the message m11 to the image forming apparatus 10, via the network N. Upon receipt of the message m11 from the information processing apparatus 30A (S22), the communication device 16 of the image forming apparatus 10 transmits the message m11 to the remaining information processing apparatuses 30B to 30D. Accordingly, the remaining information processing apparatuses 30B to 30D also receive the message m11 from the information processing apparatus 30A, and the message m11 is displayed on the group chat screen of the display device 32 of each of the information processing apparatuses 30B to 30D. For example, the message m11 is also displayed on the group chat screen of the display device 32 of the information processing apparatus 30D, as shown in FIG. 6A.

When the user of the information processing apparatus 30D inputs a message m12 written in Chinese to the group chat screen (S32), the controller 41 of the information processing apparatus 30D causes the communication device 35 to transmit the message m12 to the image forming apparatus 10, via the network N. The image forming apparatus 10 receives the message m12 (S22), and the language identification unit 23 identifies the language of the message m12 (S23), when the communication device 16 receives the message m12 inputted to the group chat, from the information processing apparatus 30. When the language identification unit 23 identifies the language of the message m12, the controller 21 stores link information, in which the identified language and the information processing apparatus 30D that transmitted the message m12 are associated with each other, in the storage device 19 (S24).

The controller 21 of the image forming apparatus 10 decides whether an installation condition is satisfied (S25). For example, when the language of the message m12 identified by the language identification unit 23 (i.e., Chinese) is not installed as a language usable with the image forming apparatus 10, the controller 21 decides that the installation condition is satisfied (YES at S25), and causes the communication device 16 to output an installation confirmation message m14 asking whether Chinese, identified by the language identification unit 23, may be installed (e.g., message like "May Chinese be installed?"), in the language that has been identified (i.e., Chinese), to the group chat (S26).

The controller 41 of the information processing apparatus 30D causes the display device 32 to display the installation confirmation message m14 ("May Chinese be installed?" in Chinese) on the group chat screen, as shown in FIG. 6B (S33).

When the user of the information processing apparatus 30D inputs an installation instruction message m15 (e.g., message like "Please install Chinese") in the identified language (i.e., Chinese), to the group chat screen as shown in FIG. 6B (S34), the controller 41 of the information processing apparatus 30D causes the communication device 35 to transmit the installation instruction message m15 to the image forming apparatus 10, via the network N.

When the communication device 16 receives the installation instruction message m15 written in the identified language (i.e., Chinese), inputted to the group chat (S27), the controller 21 of the image forming apparatus 10 retrieves the language data indicating the identified language (i.e., Chinese) from the storage device 19, and installs Chinese as the language usable with the image forming apparatus 10 (S28).

When a message m13 written in German from the information processing apparatus 30B is inputted to the group chat screen (S12), the controller 41 of the information processing apparatus 30B transmits the message m13 to the image forming apparatus 10. Here, although the image forming apparatus 10 also performs the operation of S23 and S24 with respect to the message m11 and the message m13, since the message m11 is written in English and the message m13 is written in German, both of which are already installed as the languages usable with the image forming apparatus 10, the installation condition is not satisfied (NO at S25), and the operation proceeds to S29.

The controller 21 of the image forming apparatus 10 recognizes that the installation instruction message m15 is the message instructing to install in the image forming apparatus 10 in the group chat, provided that the message immediately after the installation confirmation message m14 is the installation instruction message m15 written in Chinese, in other words that the language identification unit 23 has identified that the installation instruction message m15 is in Chinese. Although the installation instruction message m15 is assumed to be the message in Chinese saying "Please install Chinese" in this example, the content of the message may be disregarded, provided that the message is written in Chinese. In this case, the controller 21 recognizes that the message represents the installation instruction, when the message is in Chinese. Alternatively, the controller 21 of the image forming apparatus 10 may recognize that the message represents the installation instruction into the image forming apparatus 10, when a message written in the identified language (in this example, Chinese) is included in the messages in a predetermined range after the installation confirmation message m14 (e.g., up to five messages).

Further, a special character (e.g., #), indicating that the instruction to the image forming apparatus 10 follows thereafter, may be employed, and the special character may be followed by the instruction message representing the content of the instruction (e.g., "#Install Chinese"). In such a case, the controller 21 of the image forming apparatus 10 can easily decide, among the character strings inputted to the group chat screen, that a character string led by the special character (e.g., #) is an instruction to the image forming apparatus 10. Therefore, the accuracy of the instruction to the image forming apparatus 10 can be improved.

After S28, or in the case of NO at S25, the controller 21 of the image forming apparatus 10 decides whether a message has been received (S29). When a message has been received (YES at S29), the controller 21 proceeds to S23. If no message has been received (NO at S29), the controller 21 decides whether the chat has finished (S29A). For example, when the user operates the image forming apparatus 10 so as to finish the chat (YES at (S29A), the controller 21 finishes the group chat, thus closing the process. When the operation to finish the chat has not been performed (NO at S29A), the group chat is continued.

With the communication system 1 and the image forming apparatus 10 according to the first embodiment, the language usable with the image forming apparatus 10 can be installed without time and labor, according to the language used by the user of the group chat, utilizing the group chat function, which leads to improved user-friendliness of the image forming apparatus 10.

The controller 21 causes the communication device 16, when the language identified by the language identification unit 23 is not installed, to output the installation confirmation message m14 in the identified language, for confirming whether the language identified by the language identification unit 23 is to be installed, to the group chat. Further, when the communication device 16 receives the installation instruction message m15 in the identified language inputted to the group chat, the controller 21 retrieves the language data indicating the identified language from the storage device 19, and installs the identified language as the language usable with the image forming apparatus 10. Such an arrangement allows the question whether the language identified by the language identification unit 23 may be installed to be presented to a specific user familiar with the language identified by the language identification unit 23, thereby urging the specific user to return the installation instruction message m15 to the group chat. Thus, the language familiar to the specific user of the group chat can be easily and quickly installed, as the language usable with the image forming apparatus 10. In other words, when a new language, other than the languages usable with the image forming apparatus 10, is inputted to the group chat, the installation confirmation message m14 in the new language, for confirming whether the new language may be installed, is displayed on the group chat screen of the information processing apparatus 30, and the new language is installed, when the installation instruction is inputted in the new language, to the group chat. Therefore, the new language can be easily and quickly added as the language usable with the image forming apparatus 10, when the chat in the new language is started in the group chat.

Figure 7:
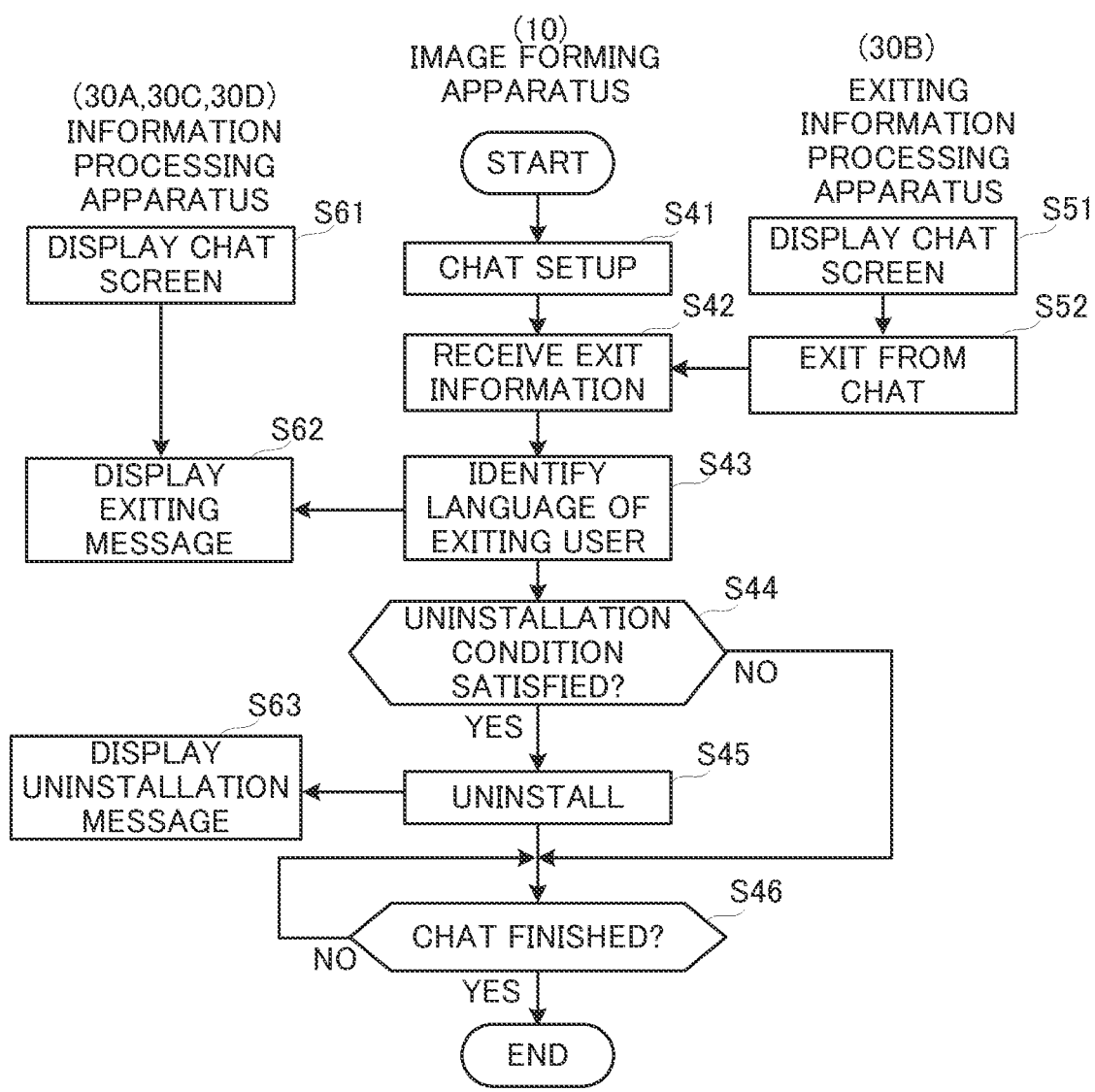
FIG. 7 is a flowchart showing a process of deleting a language because of a member exiting from the chat, using the group chat function of the communication system according to the first embodiment.

Hereunder, a process to delete a language using the group chat function, in the communication system 1 according to the first embodiment, will be described with reference to FIG. 7. FIG. 7 is a flowchart showing a process of deleting a language because of a member exiting from the chat, using the group chat function of the communication system according to the first embodiment.

Figure 8A:
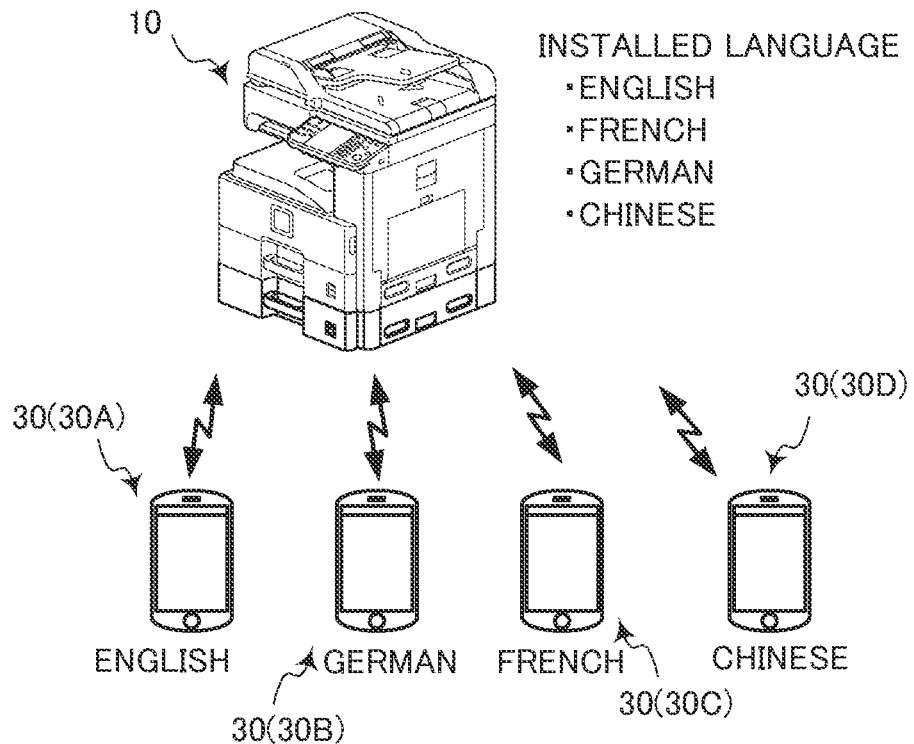
FIG. 8A is a schematic drawing showing a state where the image forming apparatus and four information processing apparatuses are performing group chat.
Figure 8B:
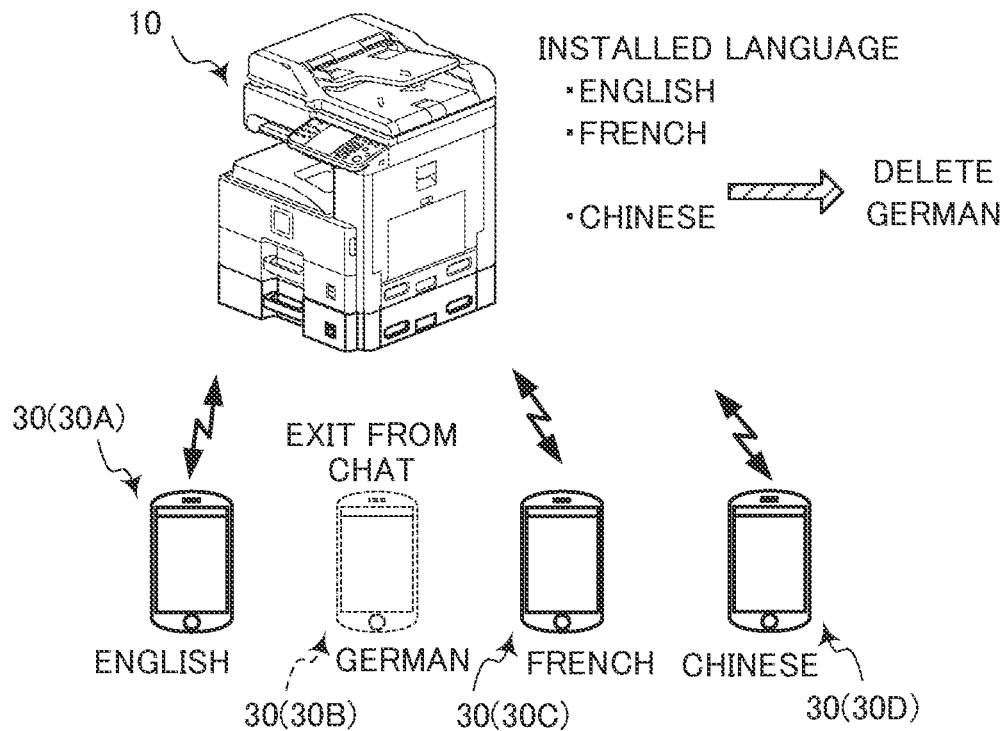
FIG. 8B is a schematic drawing showing a state where a language is deleted because of one of the information processing apparatuses exiting from the chat.
Figure 9B:
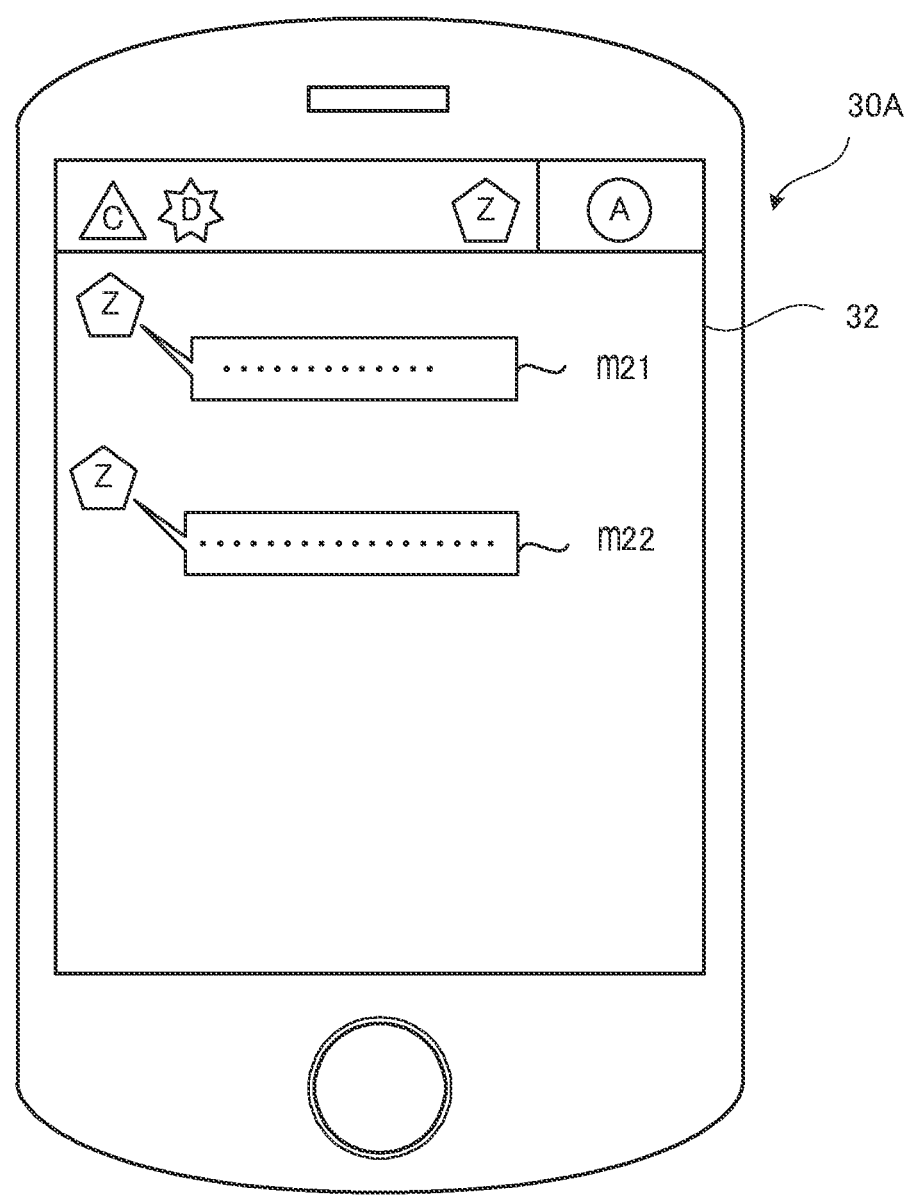

The description given hereunder refers to an example where, as shown in FIG. 8A to FIG. 9B, a language is deleted because of one of the information processing apparatuses exiting from the chat. FIG. 8A is a schematic drawing showing a state where the image forming apparatus and four information processing apparatuses are performing group chat. FIG. 8B is a schematic drawing showing the state where a language is deleted because of one of the information processing apparatuses exiting from the chat. FIG. 9A and FIG. 9B are schematic drawings each showing an example of the screen displayed on the display device of the information processing apparatus. It will be assumed here that English, German, French, and Chinese are already installed, as the languages usable with the image forming apparatus 10, as shown in FIG. 8A.

The establishing of the group chat by the chat setup unit 22 of the image forming apparatus 10 (S41 in FIG. 7) is performed in the same way as S21 of FIG. 3. In addition, the display on the group chat screen by the chat setup unit 42 of the four information processing apparatuses 30A to 30D (S51, S61) is performed in the same way as S11 of FIG. 3. Therefore, the description about S41, S51, and S61 is skipped.

In this example, as shown in FIG. 8A and FIG. 8B, the information processing apparatus 30B owned by the user who uses German exits from the group chat.

When the user of the information processing apparatus 30B operates so as to exit from the group chat, the controller 41 of the information processing apparatus 30B causes the communication device 35 to transmit the exit information indicating that the information processing apparatus 30B is exiting from the group chat, to the image forming apparatus 10 (S52).

When the communication device 16 receives the exit information from the information processing apparatus 30B (S42), the controller 21 of the image forming apparatus 10 identifies the language of the information processing apparatus 30B that has outputted the exit information, on the basis of the link information in the storage device 19 (S43). More specifically, the controller 21 identifies that the user of the information processing apparatus 30B uses German, according to the link information in the storage device 19. Then the controller 21 of the image forming apparatus 10 generates an exit message m21 (e.g., message like "User of German has exited") in the identified language (i.e., German), and causes the communication device 16 to transmit the generated exit message m21 in German, to the information processing apparatuses 30A, 30C, and 30D remaining in the group chat.

The controller 41 of the information processing apparatus 30A causes the display device 32 to display the exit message m21 (e.g., message like "User of German has exited") in German, on the group chat screen, as shown in FIG. 9A (S62). The respective controllers 41 of the information processing apparatuses 30C and 30D also display the exit message m21 in German on the group chat screen (S62), in the same way as the information processing apparatus 30A.

The controller 21 of the image forming apparatus 10 decides whether an uninstallation condition is satisfied (S44). For example, upon deciding that no other information processing apparatuses are using the language of the information processing apparatus 30B that has outputted the exit information (German), the controller 21 decides that the uninstallation condition is satisfied (YES at S44). In this example, since the controller 21 can decide that the information processing apparatuses 30A, 30C, and 30D remaining in the group chat are not using German, according to the link information in the storage device 19, the controller 21 decides that no other information processing apparatuses are using German.

The controller 21 of the image forming apparatus 10 uninstalls the language of the information processing apparatus 30B that has outputted the exit information (German), as an unused language (S45). The controller 21 then generates an uninstallation message m22 (e.g., message like "German has been uninstalled") in German, and causes the communication device 16 to transmit the generated uninstallation message m22 in German to the information processing apparatuses 30A, 30C, and 30D remaining in the group chat.

The respective controllers 41 of the information processing apparatuses 30A, 30C, and 30D cause the display device 32 to display the uninstallation message m22 on the group chat screen, as shown in FIG. 9B (S63).

The controller 21 decides whether the chat has finished (S46). For example, when the user operates the image forming apparatus 10 so as to finish the chat (YES at S46), the controller 21 finishes the group chat, thus closing the process. When the operation to finish the chat has not been performed (NO at S46), the group chat is continued.

With the communication system 1 and the image forming apparatus 10 according to the first embodiment, the language of the member who has exited is uninstalled, when none of the other information processing apparatuses 30A, 30C, and 30D is using the language of the member who has exited from the group chat. Accordingly, the language that is no longer used in the group chat can be properly deleted without time and labor, from the languages usable with the image forming apparatus 10. Consequently, the languages usable with the image forming apparatus 10 can be properly prepared, in accordance with the languages used by the members of the group chat.

Now, the chat tool has the group chat function. When the languages usable with the image forming apparatus can be prepared without time and labor, using the group chat function, in accordance with the languages of the members of the group chat image, the user-friendliness of the forming apparatus can be improved.

The image forming apparatus according to the first example of the foregoing background art, however, can only switch the language usable with the image forming apparatus to the language of the user, when the user is about to utilize the image forming apparatus, and is unable to prepare the languages usable with the image forming apparatus in accordance with the members of the group chat. In addition, the system according to the second example of the background art can only transmit a message such as a print request to the printer, using the chat function, and is unable to prepare the languages usable with the image forming apparatus, in accordance with the members of the group chat.

Further, such an arrangement that the user or the manager manually installs the languages of all the members of the group chat one by one, as the languages usable with the languages usable with the image forming apparatus, to thereby prepare the languages usable with the image forming apparatus in accordance with the members of the group chat, is quite troublesome and inconvenient, and is therefore unpractical. In addition, when the number of members of the group chat increases or decreases, the corresponding language has to be manually installed or uninstalled, which is also troublesome and inconvenient.

With the arrangement according to this embodiment, in contrast, the languages usable with the image forming apparatus can be prepared without time and labor, using the group chat function, in accordance with the languages of the members of the group chat.

Figure 10:
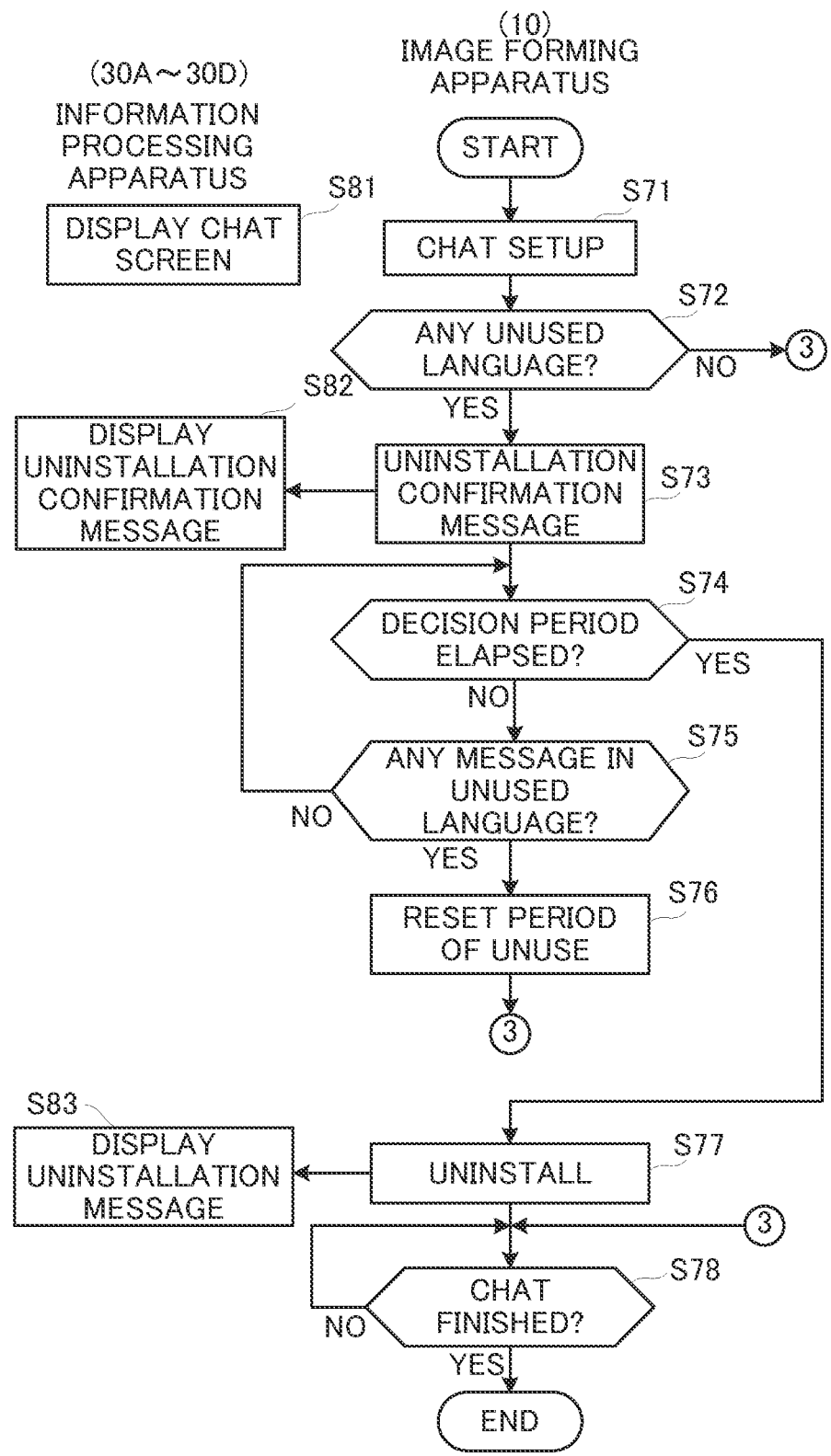
FIG. 10 is a flowchart showing a process of deleting an unused language, using the group chat function of the communication system according to a second embodiment.

Hereunder, a process to delete am unused language using the group chat function, in the communication system 1 according to a second embodiment, will be described with reference to FIG. 10. FIG. 10 is a flowchart showing a process of deleting the unused language, using the group chat function of the communication system according to the second embodiment.

Figure 11A:
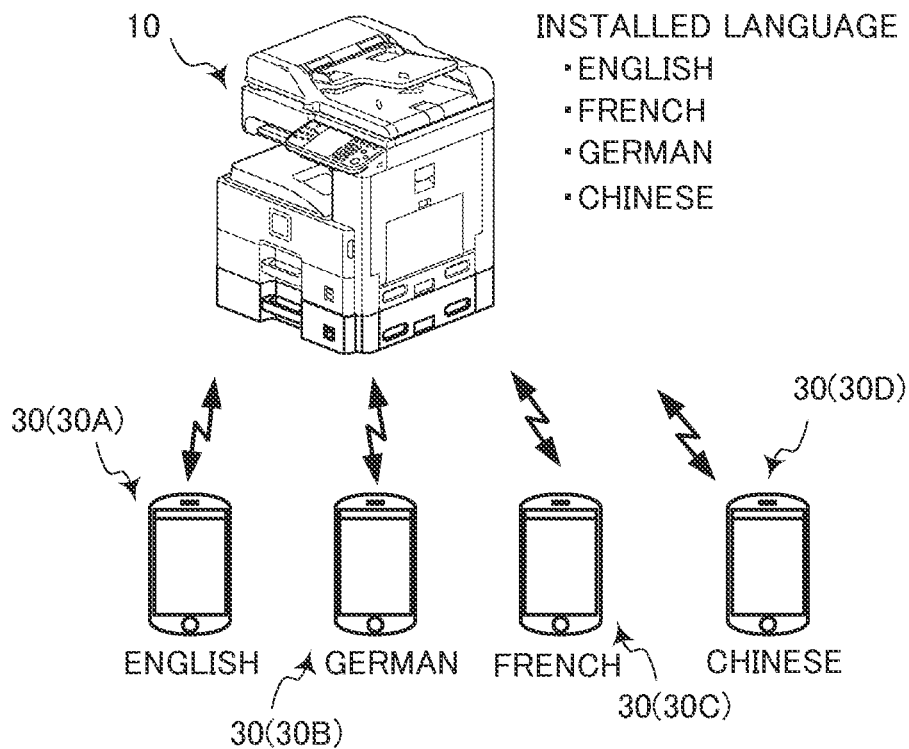
FIG. 11A is a schematic drawing showing a state where the image forming apparatus and four information processing apparatuses are performing group chat.
Figure 11B:
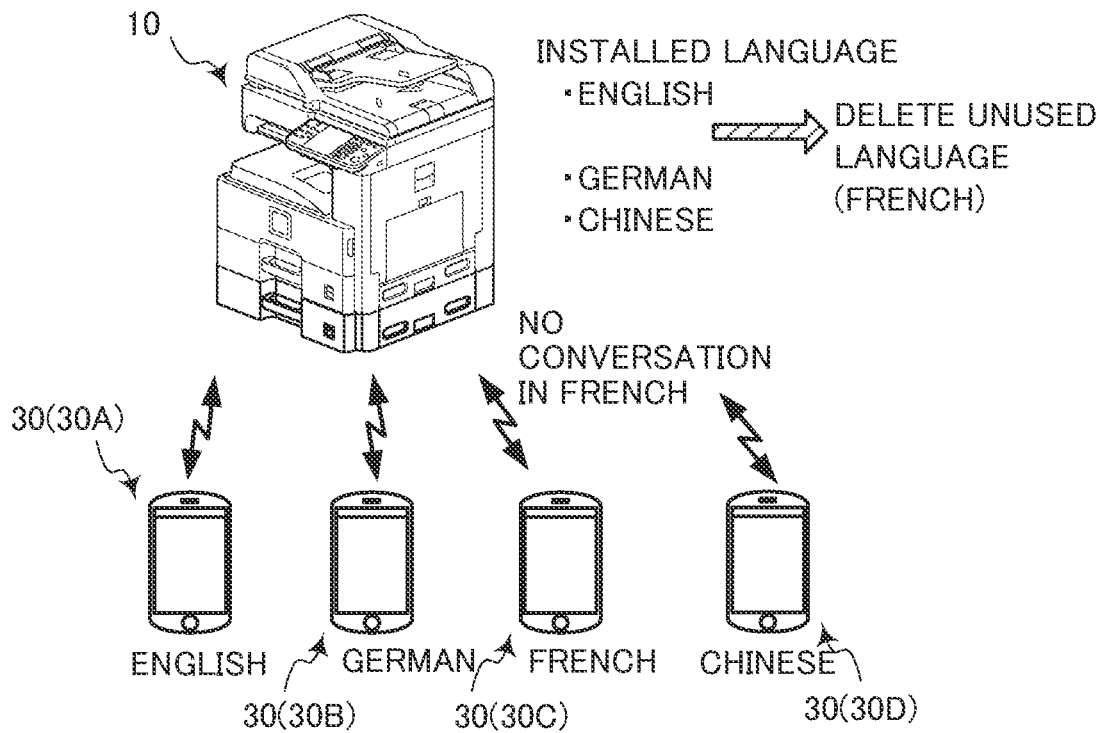
FIG. 11B is a schematic drawing showing a state where an unused language is deleted.
Figure 12A:
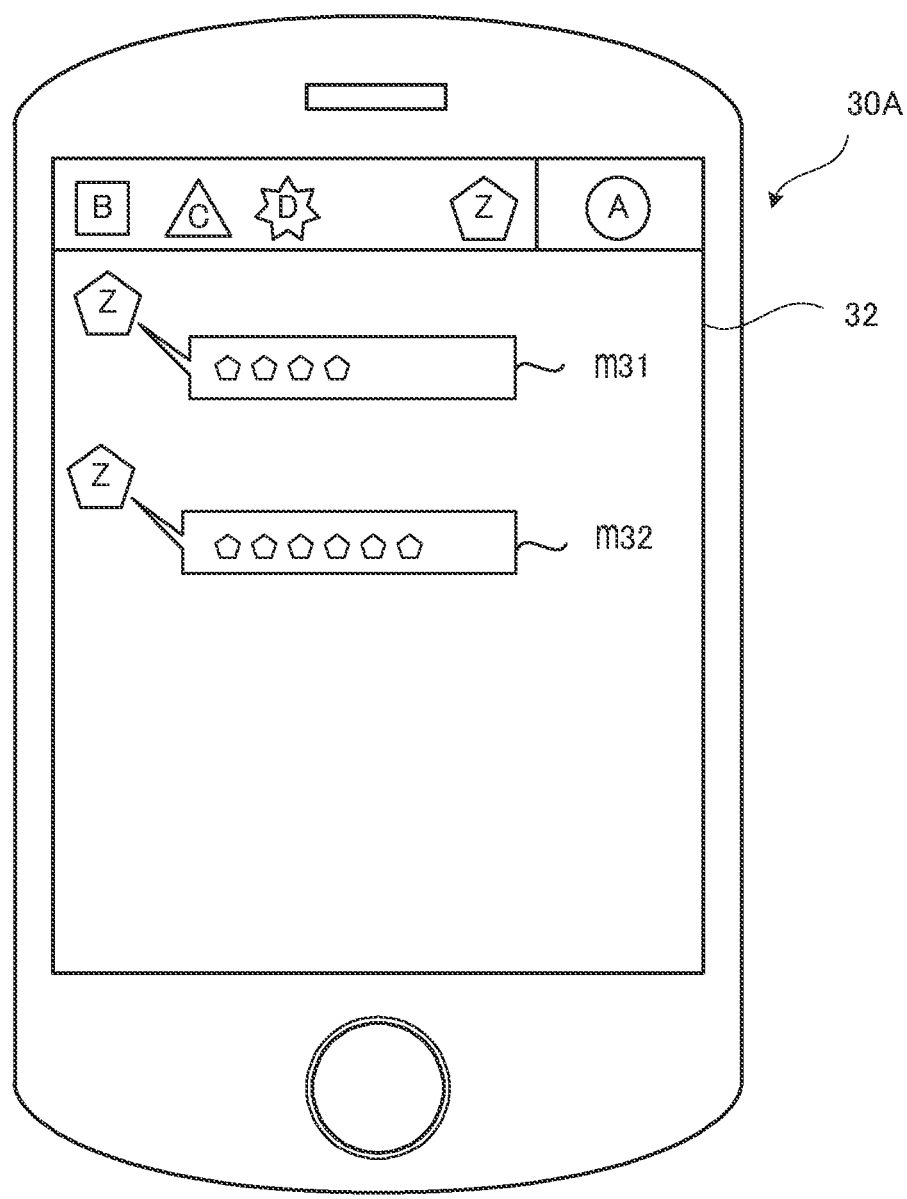
FIG. 12A and FIG. 12B are schematic drawings each showing an example of the screen displayed on the display device of the information processing apparatus.
Figure 12B:
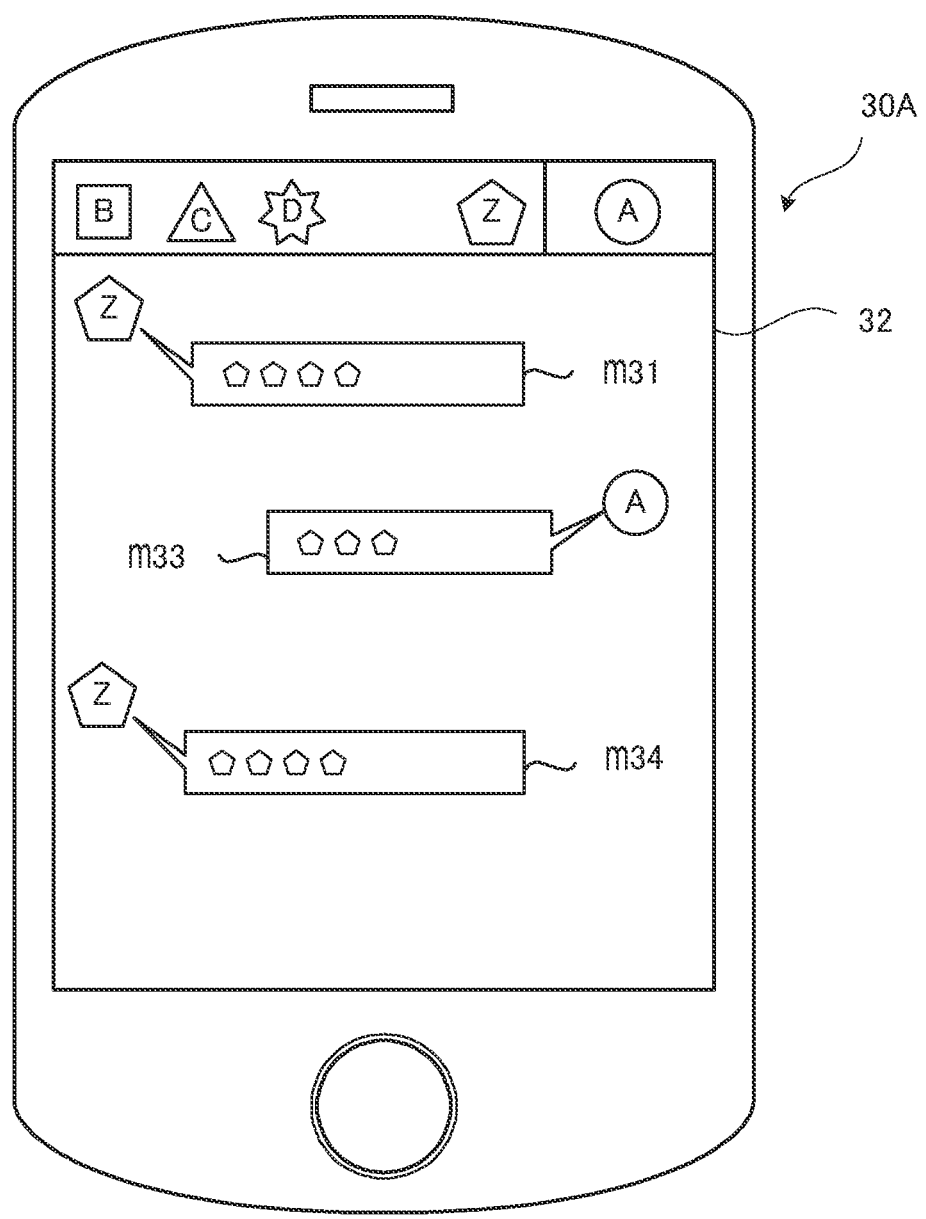

In this example, the unused language is deleted as shown in FIG. 11A to FIG. 12B. FIG. 11A is a schematic drawing showing a state where the image forming apparatus and four information processing apparatuses are performing group chat. FIG. 11B is a schematic drawing showing a state where the unused language is deleted. FIG. 12A and FIG. 12B are schematic drawings each showing an example of the screen displayed on the display device of the information processing apparatus. It will be assumed here that English, German, French, and Chinese are already installed, as the languages usable with the image forming apparatus 10, as shown in FIG. 11A.

The establishing of the group chat by the chat setup unit 22 of the image forming apparatus 10 (S71 in FIG. 10) is performed in the same way as S21 of FIG. 3. In addition, the display on the group chat screen by the chat setup unit 42 of the four information processing apparatuses 30A to 30D (S81) is performed in the same way as S11 of FIG. 3. Therefore, the description about S71 and S81 is skipped.

In this example, as shown FIG. 11A and FIG. 11B, French is decided to be the unused language, with respect to the information processing apparatus 30C owned by the user who uses French.

In the second embodiment, when the language identification unit 23 identifies the language of the message, the controller 21 of the image forming apparatus 10 stores the link information, in which the identified language, the information processing apparatus that has outputted the message, and the time that the message has been received are associated with each other, in the storage device 19.

The controller 21 of the image forming apparatus 10 decides whether an unused language that has not been used for a predetermined period (e.g., one month) is included in the languages being used in the group chat, on the basis of the link information stored in the storage device 19 (S72). For example, the controller 21 may decide whether the predetermined period (e.g., one month) has elapsed from the time that the last message was received, with respect to each of the languages being used in the group chat. In this example, as shown in FIG. 11B, although the information processing apparatus 30C is participating (registered) in the group chat, conversation in French has not been made for one month, and therefore French is regarded as unused.

Upon deciding that one of the languages is unused (YES at S72), the controller 21 generates, as shown in FIG. 12A, an uninstallation confirmation message m31 (e.g., message like "French will be uninstalled") in the unused language (i.e., French), to confirm whether the unused language may be uninstalled, and causes the communication device 16 to transmit the uninstallation confirmation message m31 generated, to the information processing apparatuses 30A, 30B, and 30D remaining in the group chat (S73).

The controller 41 of the information processing apparatus 30A causes the display device 32 to display the uninstallation confirmation message m31 (e.g., message like "French will be uninstalled") on the group chat screen, as shown in FIG. 12A (S82). The respective controllers 41 of the information processing apparatuses 30B and 30D also display the uninstallation confirmation message m31 on the group chat screen (S82), in the same way as the information processing apparatus 30A.

The controller 21 of the image forming apparatus 10 decides whether a predetermined decision period (e.g., one hour) has elapsed after the uninstallation confirmation message m31 was inputted to the group chat (S74). In the case where the predetermined decision period has not elapsed (NO at S74), the controller 21 decides whether a message in the unused language (i.e., French) has been received (S75). When no message in the unused language (i.e., French) has been received (NO at S75), the controller 21 proceeds to S74.

Upon deciding that the predetermined decision period (e.g., one hour) has elapsed (YES at S74), controller 21 of the image forming apparatus 10 uninstalls the unused language (i.e., French) (S77). Thus, the controller 21 uninstalls the unused language (i.e., French), when no message in the unused language has been received.

Then the controller 21 of the image forming apparatus 10 generates an uninstallation message m32 to the effect that the unused language has been uninstalled (e.g., message like "French has been uninstalled") in the unused language, and causes the communication device 16 to transmit the uninstallation message m32 generated, to the information processing apparatuses 30A, 30B, and 30D remaining in the group chat.

The respective controllers 41 of the information processing apparatuses 30A, 30B, and 30D cause the display device 32 to display the uninstallation message m32 on the group chat screen, as shown in FIG. 12A (S83).

However, in the case where a message m33 (e.g., message like "I am using French") in the unused language (i.e., French) is received as shown in FIG. 12B (YES at S75), the controller 21 of the image forming apparatus 10 resets the above period (S76), and causes the communication device 16 to transmit an uninstallation cancellation message m34 (e.g., message like "Uninstallation of French is cancelled") in the unused language (i.e., French), to the information processing apparatuses 30A, 30B, and 30D remaining in the group chat. Then the controller 21 proceeds to S78.

The controller 21 decides whether the chat has finished (S78). For example, when the user operates the image forming apparatus 10 so as to finish the chat (YES at S78), the controller 21 finishes the group chat, thus closing the process. When the operation to finish the chat has not been performed (NO at S78), the group chat is continued.

With the communication system 1 and the image forming apparatus 10 according to the second embodiment, while the languages being used in the group chat are kept installed as the languages usable with the image forming apparatus 10, the unused language that is no longer used in the group chat can be excluded from the languages usable with the image forming apparatus 10. In other words, only the languages actually used in the group chat are kept installed as the languages usable with the image forming apparatus 10. Therefore, the languages usable with the image forming apparatus 10 can be properly prepared, in accordance with the languages being used in the group chat.

In addition, the user is requested to confirm whether the unused language may be uninstalled, and the unused language is uninstalled, when no message in the unused language is received from the user. Therefore, the languages usable with the image forming apparatus 10 can be prepared in accordance with the intention of the user.

Although the uninstallation confirmation message m31 is generated and transmitted to the image forming apparatus 10 in the second embodiment, as shown in FIG. 12A and FIG. 12B (S73 in FIG. 10), the unused language may be uninstalled, skipping S73 and S82 in FIG. 10.

Figure 13:
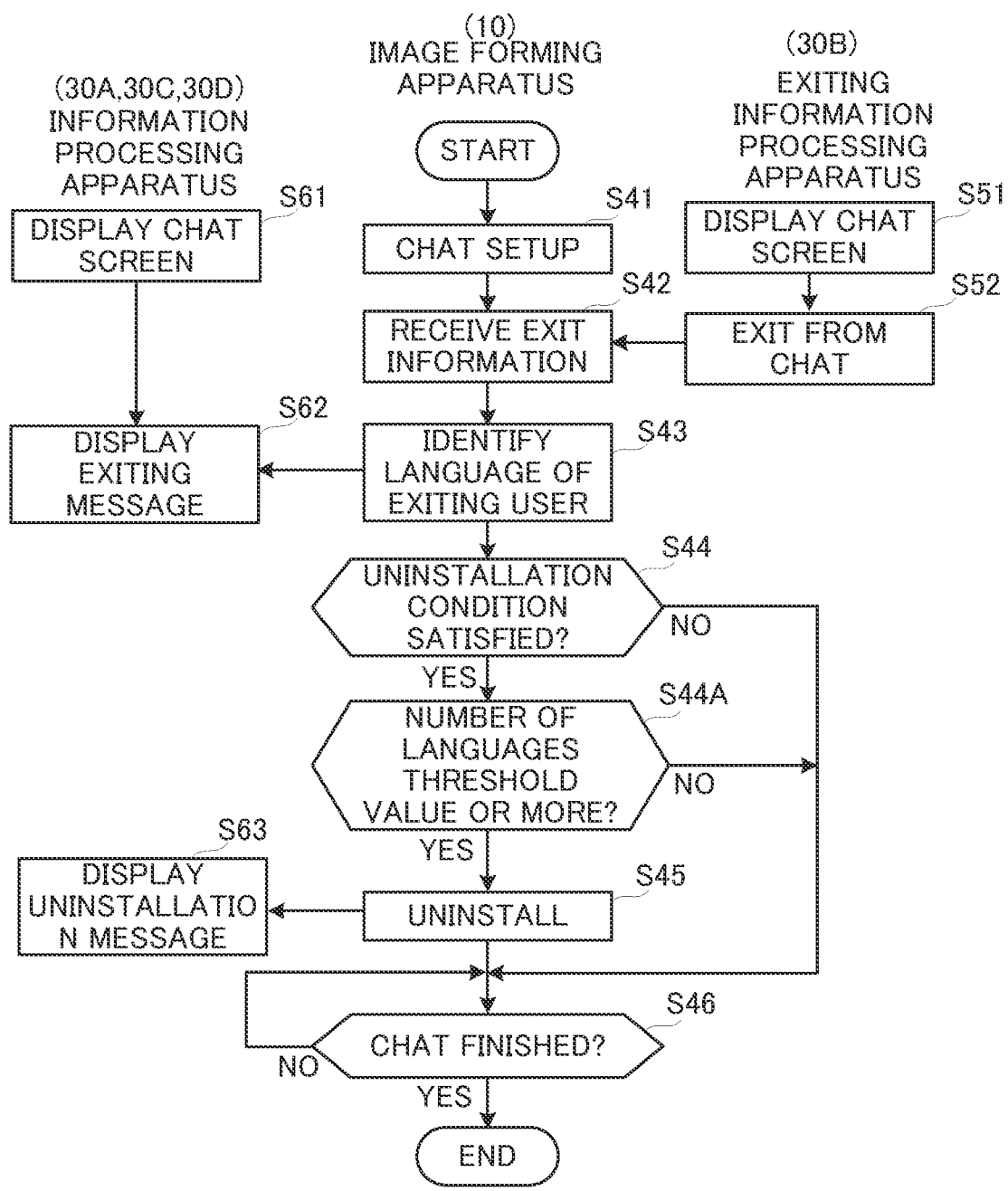
FIG. 13 is a flowchart showing a process of deleting a language, using the group chat function of the communication system according to a first variation of the first embodiment.

Hereunder, the communication system 1 according to a first variation of the first embodiment will be described, with reference to FIG. 13. FIG. 13 is a flowchart showing a process of deleting a language, using the group chat function of the communication system according to the first variation of the first embodiment.

The first variation of the first embodiment is different from the first embodiment, in that the unused language is not uninstalled, when the number of languages usable with the image forming apparatus 10 is fewer than a predetermined threshold value. FIG. 13 is different from FIG. 7 in additionally including S44A, and such difference will be described in detail.

The storage device 19 contains, in advance, a threshold value (e.g., five) of the number of languages usable with the image forming apparatus 10.

When the uninstallation condition is decided to be satisfied (YES at S44), the controller 21 of the image forming apparatus 10 does not uninstall the unused language, in the case where the number of languages usable with the image forming apparatus 10 is fewer than the threshold value (NO at S44A), and proceeds to S46. When the number of languages usable with the image forming apparatus 10 is equal to or larger than the threshold value (YES at S44A), the controller 21 uninstalls the unused language (S45).

According to the first variation of the first embodiment, the controller 21 of the image forming apparatus 10 does not uninstall the unused language, when the number of languages usable with the image forming apparatus 10 is fewer than the threshold value. Accordingly, the number of languages usable with the image forming apparatus 10 can be maintained unchanged, at a level fewer than the threshold value. For example, frequent installation and uninstallation of one language can be avoided. However, when the number of languages usable with the image forming apparatus 10 is equal to or larger than the threshold value, the controller 21 of the image forming apparatus 10 uninstalls the unused language. Therefore, updating capacity for the languages can be secured, and a new language can be properly added as the language usable with the image forming apparatus 10, when the new language is introduced in the group chat.

Figure 14:
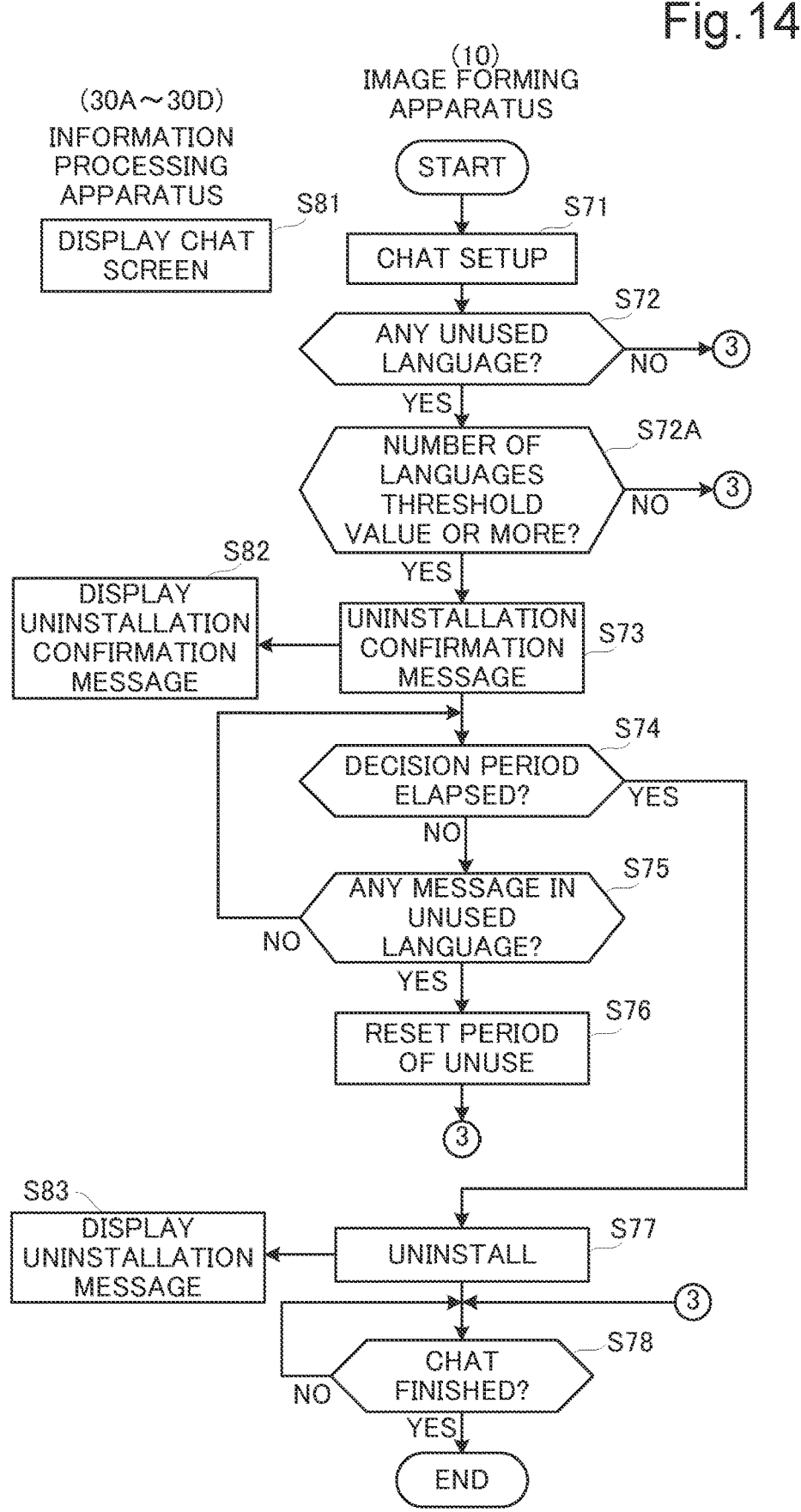
FIG. 14 is a flowchart showing a process of deleting a language, using the group chat function of the communication system according to a first variation of a second embodiment.

Hereunder, the communication system 1 according to a first variation of the second embodiment will be described, with reference to FIG. 14. FIG. 14 is a flowchart showing a process of deleting a language, using the group chat function of the communication system according to the first variation of the second embodiment.

The first variation of the second embodiment is different from the second embodiment, in that the unused language is not uninstalled, when the number of languages usable with the image forming apparatus 10 is fewer than a predetermined threshold value. FIG. 14 is different from FIG. 10 in additionally including S72A, and such difference will be described in detail.

When it is decided that one of the languages is unused (YES at S72), the controller 21 of the image forming apparatus 10 does not uninstall the unused language, in the case where the number of languages usable with the image forming apparatus 10 is fewer than the threshold value (NO at S72A), and proceeds to S78. When the number of languages usable with the image forming apparatus 10 is equal to or larger than the threshold value (YES at S72A), the controller 21 generates the uninstallation confirmation message (S73).

The first variation of the second embodiment also provides the same advantageous effects, as those provided by the first variation of the first embodiment.

Figure 15:
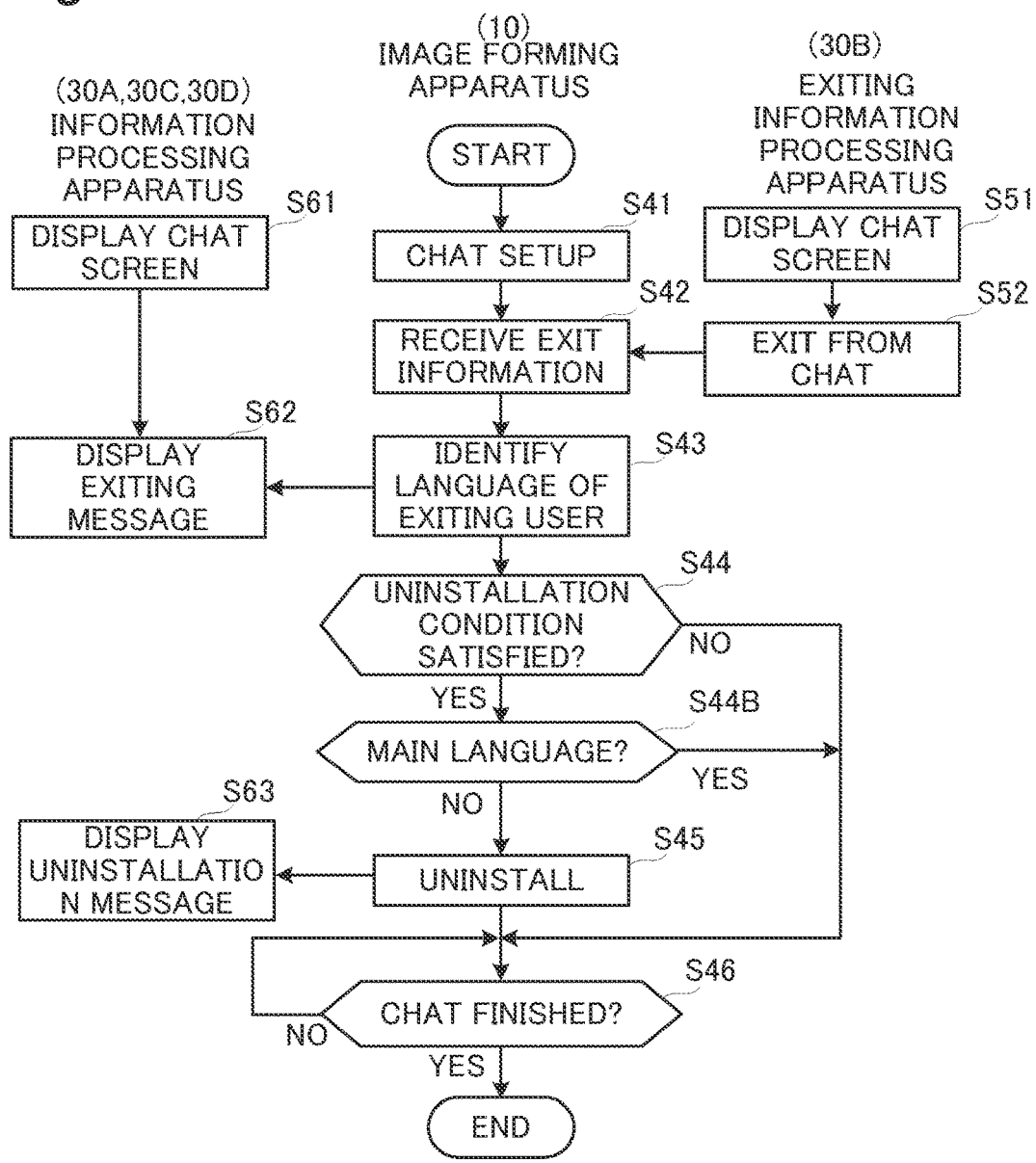
FIG. 15A is a schematic drawing showing an example of an installation information table.
FIG. 15B is a flowchart showing a process of deleting a language, using the group chat function of the communication system according to a second variation of the first embodiment.

Hereunder, the communication system 1 according to a second variation of the first embodiment will be described, with reference to FIG. 15A and FIG. 15B. FIG. 15A illustrates an example of an installation information table. FIG. 15B is a flowchart showing a process of deleting a language, using the group chat function of the communication system according to the second variation of the first embodiment.

The second variation of the first embodiment is different from the foregoing embodiments and the first variation, in that the unused language is not uninstalled, when the unused language is a main language in an installation region. FIG. 15B is different from FIG. 7 in additionally including S44B, and such difference will be described in detail.

As shown in FIG. 15A, the storage device 19 contains, in advance, the installation information table including regional language information, in which a predetermined installation region of the image forming apparatus 10, and the main language used in the installation region are associated with each other. In the installation information table shown in FIG. 15A, for example, "Japan" which is the installation region, and "Japanese and English", which are the main languages of this region, are associated with each other. Likewise, "Europe" which is another installation region, and "English and German", which are the main languages of this region, are associated with each other. The storage device 19 also contains in advance installation information, indicating the installation region of the corresponding image forming apparatus 10. It will be assumed here that the image forming apparatus 10 is installed in Europe, and that the installation information indicates "Europe".

Referring to FIG. 15B, when it is decided that the uninstallation condition is satisfied (YES at S44), the controller 21 of the image forming apparatus 10 identifies the main language of the installation region, on the basis of the installation information table containing the regional language information (see FIG. 15A) and the installation information (e.g., "Europe"), stored in the storage device 19 (S44B). The controller 21 does not uninstall the unused language, when the unused language is the main language (YES at S44B), but uninstalls the unused language (S45), when the unused language is not the main language (NO at S44B).

For example, when the installation region of the image forming apparatus 10 is Europe, German is decided to be the main language (YES at S44B) according to the installation information table (see FIG. 15A), even though German is decided to be an unused language, and therefore German is not uninstalled. However, when French is decided to be an unused language, French is uninstalled (S45) because French is not the main language (NO at S44B).

With the arrangement according to the second variation of the first embodiment, the main language of the installation region of the image forming apparatus 10 can be protected from being deleted as an unused language, thus to be permanently remain installed as the language usable with the image forming apparatus 10. In contrast, the controller 21 uninstalls the unused language, unless the unused language is the main language. Accordingly, the unused language can be uninstalled when the unused language is a language other than the main language of the installation region of the image forming apparatus 10, and the updating capacity can be secured for a main language that may be subsequently added. Consequently, the languages usable with the image forming apparatus 10 can be properly prepared, in accordance with the languages of the respective members of the group chat, with the main language of the installation region of the image forming apparatus 10 securely kept installed.

Figure 16:
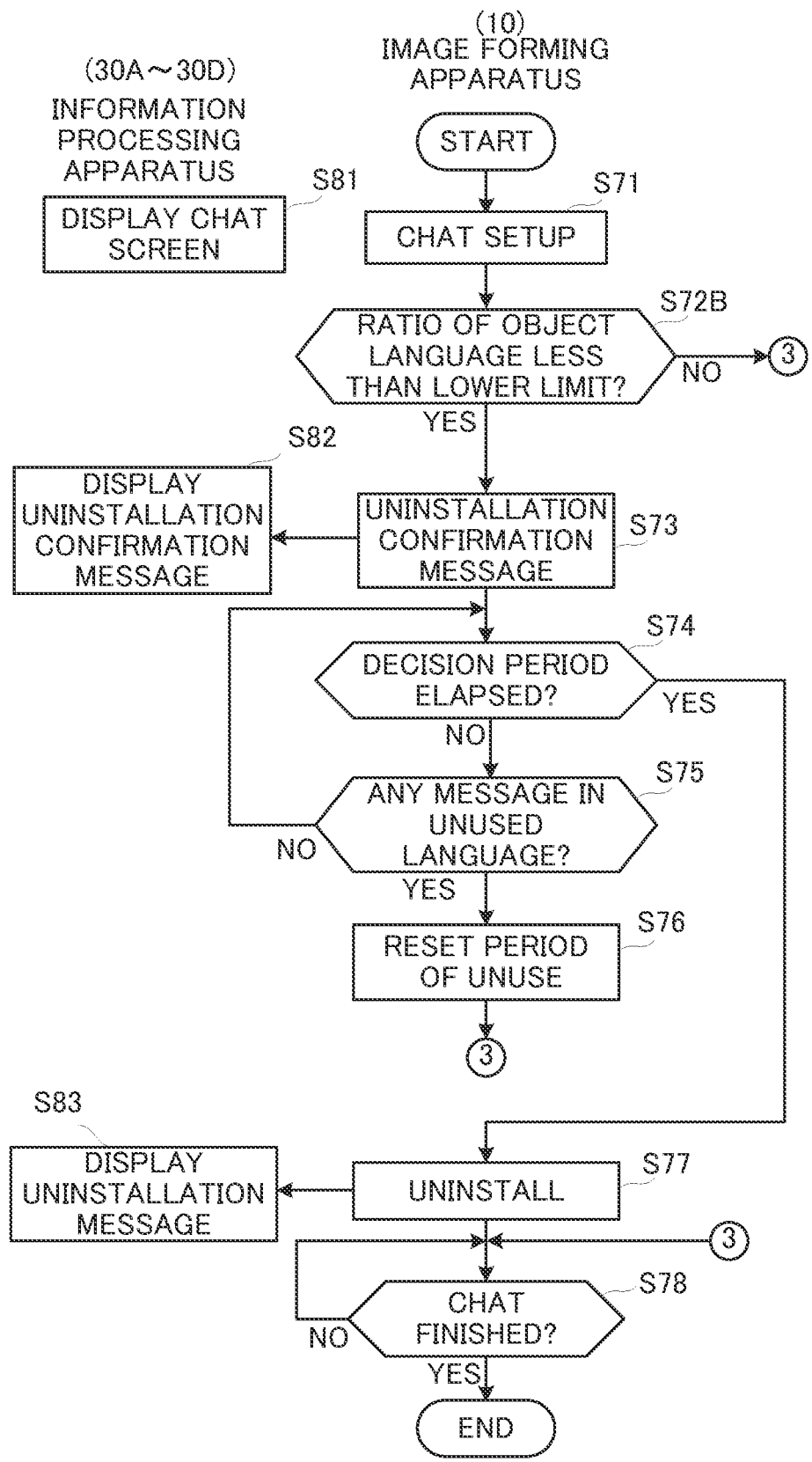
FIG. 16 is a flowchart showing a process of deleting a language, using the group chat function of the communication system according to a second variation of the second embodiment.

Hereunder, the communication system 1 according to a second variation of the second embodiment will be described, with reference to FIG. 16. FIG. 16 is a flowchart showing a process of deleting a language, using the group chat function of the communication system according to the second variation of the second embodiment.

The second variation of the second embodiment is different from the second embodiment and the first variation, in that an object language is uninstalled, when the usage ratio of the object language is lower than a lower limit. FIG. 16 is different from FIG. 10 in including S72B in place of S72, and such difference will be described in detail.

The storage device 19 contains, in advance, a predetermined lower limit (e.g., 10%) of the ratio of the number of information processing apparatuses that use the object language, to the total number of information processing apparatuses 30 participating in the group chat. The object language corresponds to each of the languages used in the group chat. It will be assumed here that, for example, the total of the information processing apparatuses 30 participating in the group chat is twenty, and that eight of them use English, six use German, five use French, and one uses Chinese.

When the ratio of the information processing apparatuses that use the object language in the group chat is lower than the predetermined lower limit (e.g., 10%) (YES at S72B), the controller 21 of the image forming apparatus 10 generates the uninstallation confirmation message (S73), and uninstalls the object language (S77). In this example, eight information processing apparatuses use English, six use German, and five use French, and therefore the usage ratio of the information processing apparatuses with respect to each language is 8/20, 6/20, and 5/20, which are higher than the lower limit (10%). In contrast, since Chinese is only used by one information processing apparatus, the usage ratio is 1/20=5%, which is lower than the lower limit (10%) (YES at S72B). Accordingly, the controller 21 generates the uninstallation confirmation message for Chinese (S73), and uninstalls Chinese, which is the object language (S77).

With the arrangement according to the second variation of the second embodiment, the object language, the usage ratio of which is lower than the lower limit in the group chat, is properly uninstalled. In other words, the object language that is infrequently used can be uninstalled without time and labor, and therefore the updating capacity for the languages can be secured.

Figure 17A:
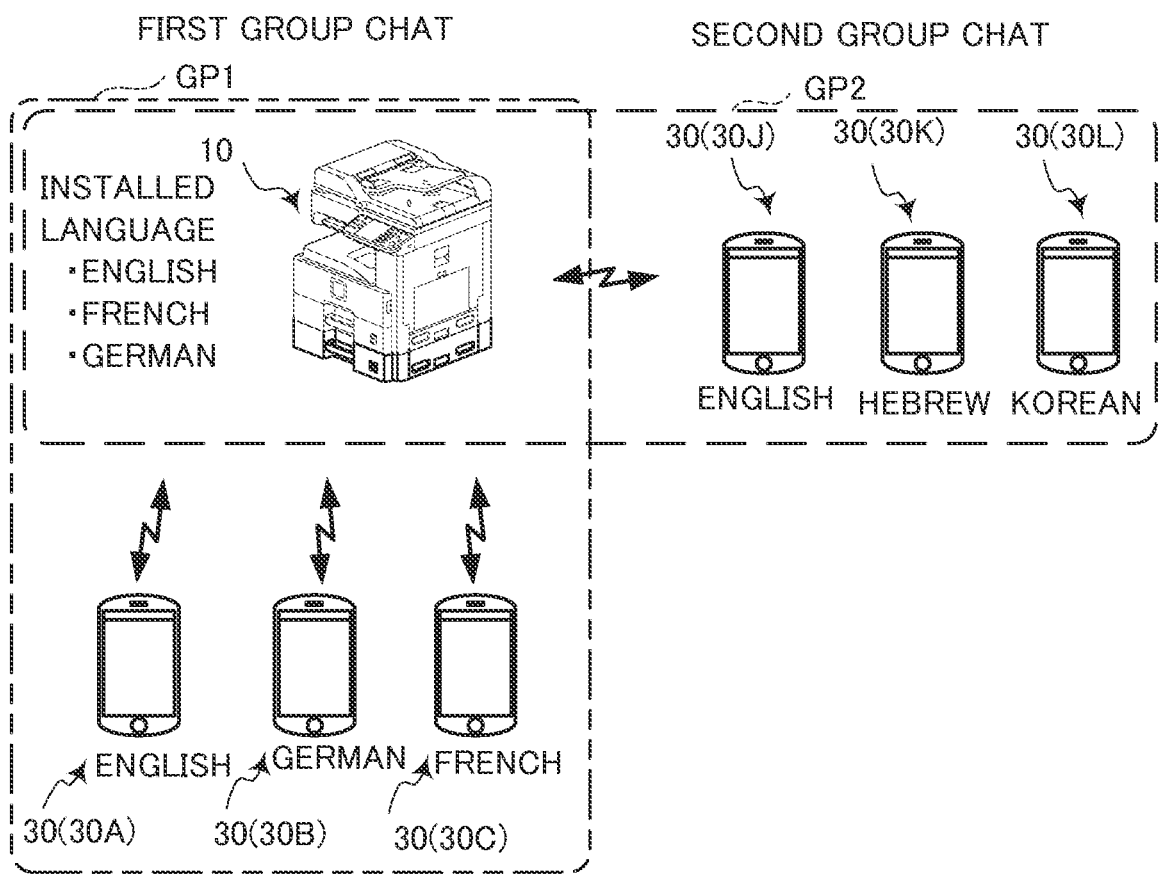
FIG. 17A is a schematic drawing showing a state where a first and a second group chat are being performed.
Figure 17B:
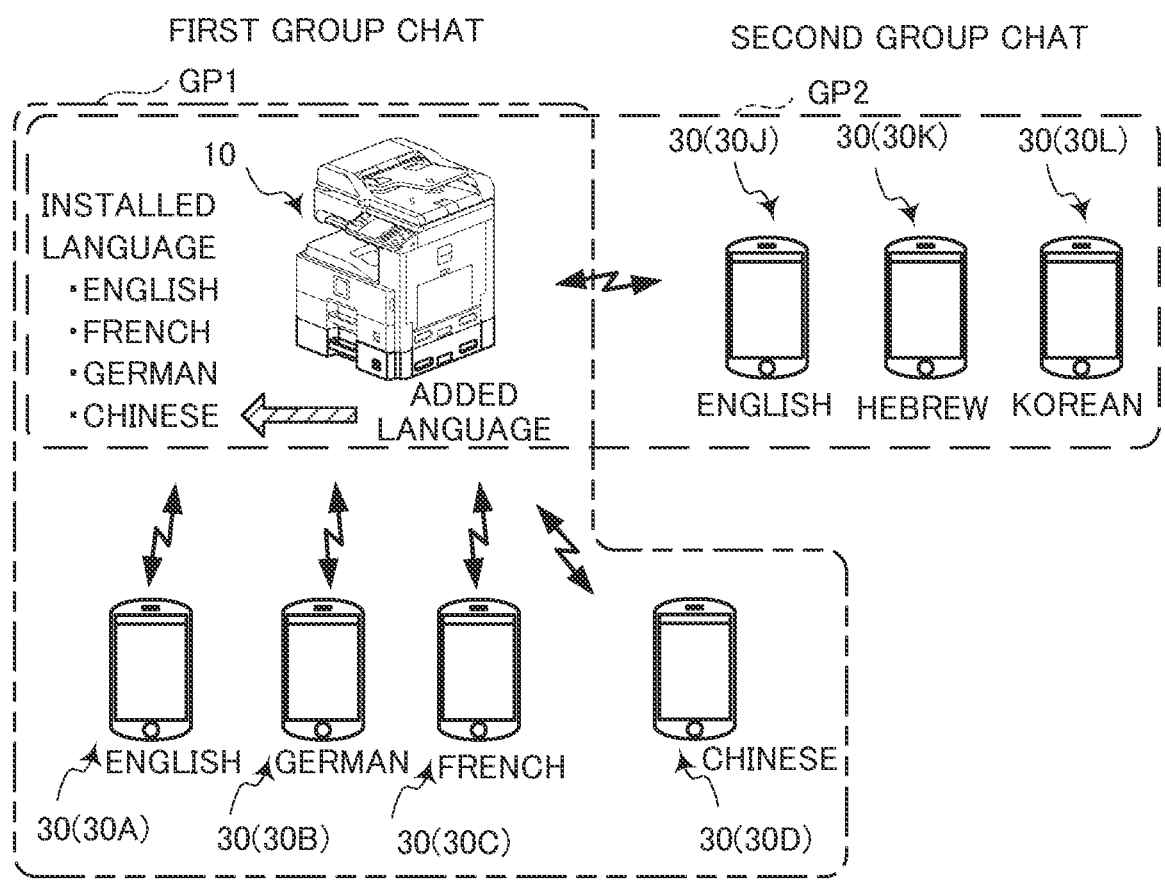
FIG. 17B is a schematic drawing showing a state where a language is added by a message from an information processing apparatus that has newly joined the first group chat.

Hereunder, the communication system 1 according to a third embodiment will be described. FIG. 17A is a schematic drawing showing a state where a first and a second group chat are being performed. FIG. 17B is a schematic drawing showing a state where a language is added by a message from an information processing apparatus that has newly joined the first group chat.

In the communication system 1 according to the third embodiment, as shown in FIG. 17A, the first group chat GP1 and the second group chat GP2 are formed. The first group chat GP1 includes the image forming apparatus 10 and three information processing apparatuses 30A, 30B, and 30C, as the members. The second group chat GP2 includes the image forming apparatus 10 and three information processing apparatuses 30J, 30K, and 30L as the members. The information processing apparatuses 30A and 30J use English, and the information processing apparatuses 30B, 30C, 30K, and 30L use German, French, Hebrew, and Korean, respectively.

The storage device 19 according to the third embodiment contains, in advance, group information indicating that the first group chat GP1 is set up as a deciding group that can decide whether a language may be added, and that the second group chat GP2 is set up as a non-deciding group unable to decide about addition of a language.

In the third embodiment, as shown in FIG. 17B, the information processing apparatus 30D has newly joined the first group chat GP1, and inputted a message in Chinese in the first group chat GP1, and therefore Chinese is installed as the languages usable with the image forming apparatus 10.

Figure 18:
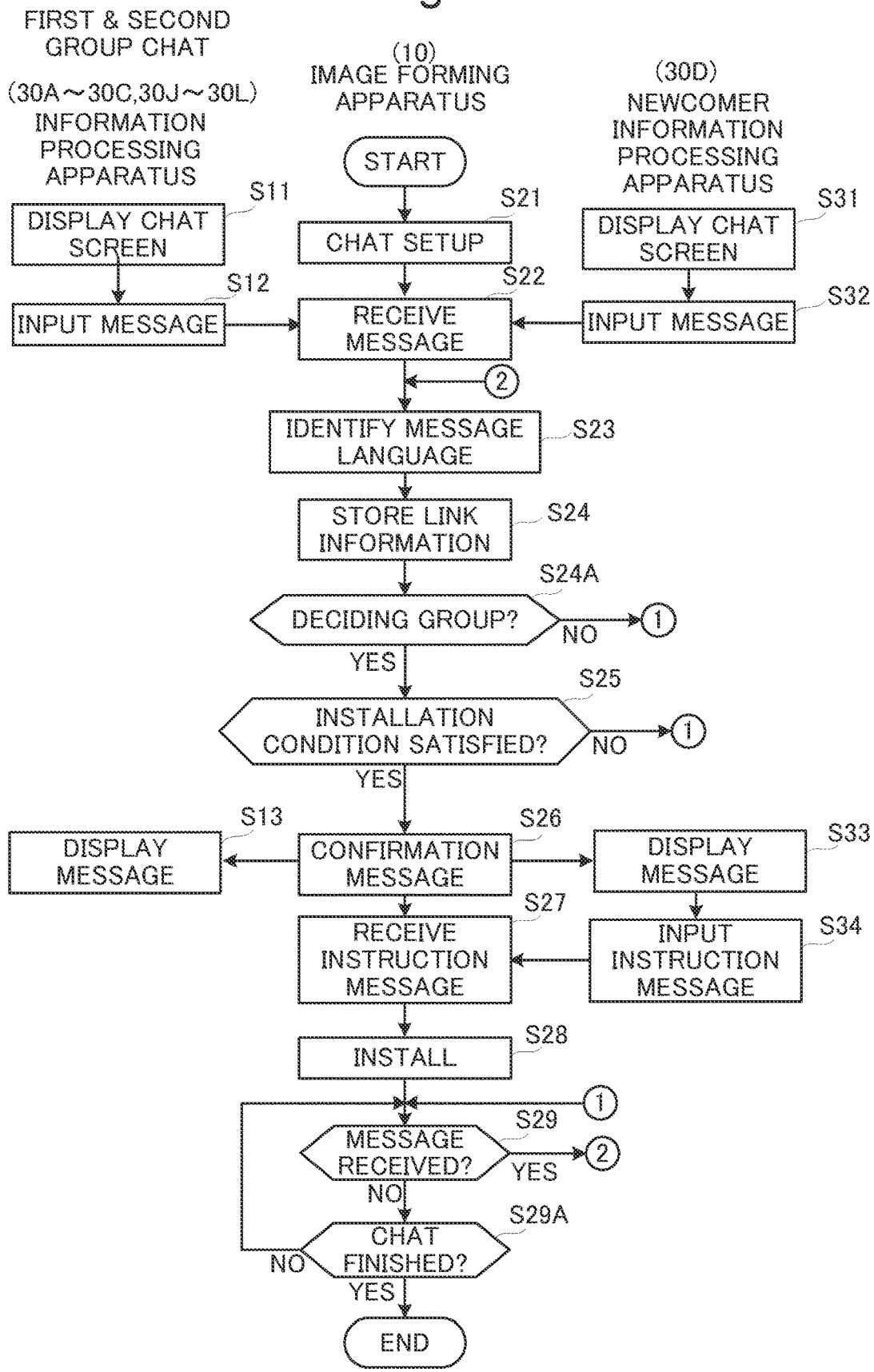
FIG. 18 is a flowchart showing a process of adding a language, using the group chat function of the communication system according to a third embodiment.

FIG. 18 is a flowchart showing a process of adding a language, using the group chat function of the communication system according to the third embodiment.

The communication system 1 according to the third embodiment is different from the first embodiment in that the operation of S24A in FIG. 18 is added to the process of FIG. 3, and therefore the operation of S24A will be described in detail.

After S24, the controller 21 of the image forming apparatus 10 decides whether the group chat that the information processing apparatus 30D has newly joined is set up as the deciding group (S24A). In this example, the information processing apparatus 30D has joined the first group chat GP1, which is the deciding group that can decide whether a language may be added. Therefore, the controller 21 decides that the information processing apparatus 30D has joined the deciding group (YES at S24A). In the case where the controller 21 decides that the information processing apparatus 30D has joined the second group chat GP2 (NO at S24A), the controller 21 proceeds to S29.

The controller 21 decides whether a predetermined installation condition is satisfied, using the group information stored in the storage device 19 (S25). The predetermined installation condition is that the language of the message from the information processing apparatus 30D inputted to the first group chat GP1, and identified by the language identification unit 23, is not installed yet.

Upon deciding that the predetermined installation condition is satisfied (YES at S25), the controller 21 retrieves the language data indicating the language identified by the language identification unit 23 from the storage device 19, when the communication device 16 receives the installation instruction message m15 as shown in FIG. 6B (S27), and installs the identified language as the languages usable with the image forming apparatus 10 (S28).

With the arrangement according to the third embodiment, when the language of the message (e.g., Chinese) inputted to the first group chat GP1 from the information processing apparatus 30D is not installed, that language in the first group chat GP1 (e.g., Chinese) can be easily and quickly installed, as the language usable with the image forming apparatus 10. On the other hand, even when the language of the message inputted to the second group chat GP2 from the information processing apparatus 30K or 30L (in this example, Hebrew or Korean) is not installed, the language in the second group chat (in this example, Hebrew or Korean) is not installed, and unable to be prepared as the language usable with the image forming apparatus 10. Further, when the information processing apparatus 30D has joined the second group chat GP2 also, the language in the second group chat (Chinese) is not installed, and unable to be prepared as the language usable with the image forming apparatus 10. Thus, the addition of the language usable with the image forming apparatus 10 can be handled in different ways between the first group chat GP1 and the second group chat GP2, and therefore the degree of priority in adding the language can be differently arranged, in the group chat.

Although the receipt of the instruction message (S27) is required as the condition for installation in the third embodiment, the controller 21 may immediately install the identified language as the languages usable with the image forming apparatus 10 (S28), upon deciding that the predetermined installation condition has been satisfied (YES at S25). In this case also, the language usable with the image forming apparatus 10 can be prepared without time and labor, using the group chat function, in accordance with the language of the member of at least one of the first group chat GP1 and the second group chat GP2, which leads to improved user-friendliness of the image forming apparatus 10.

Figure 19:
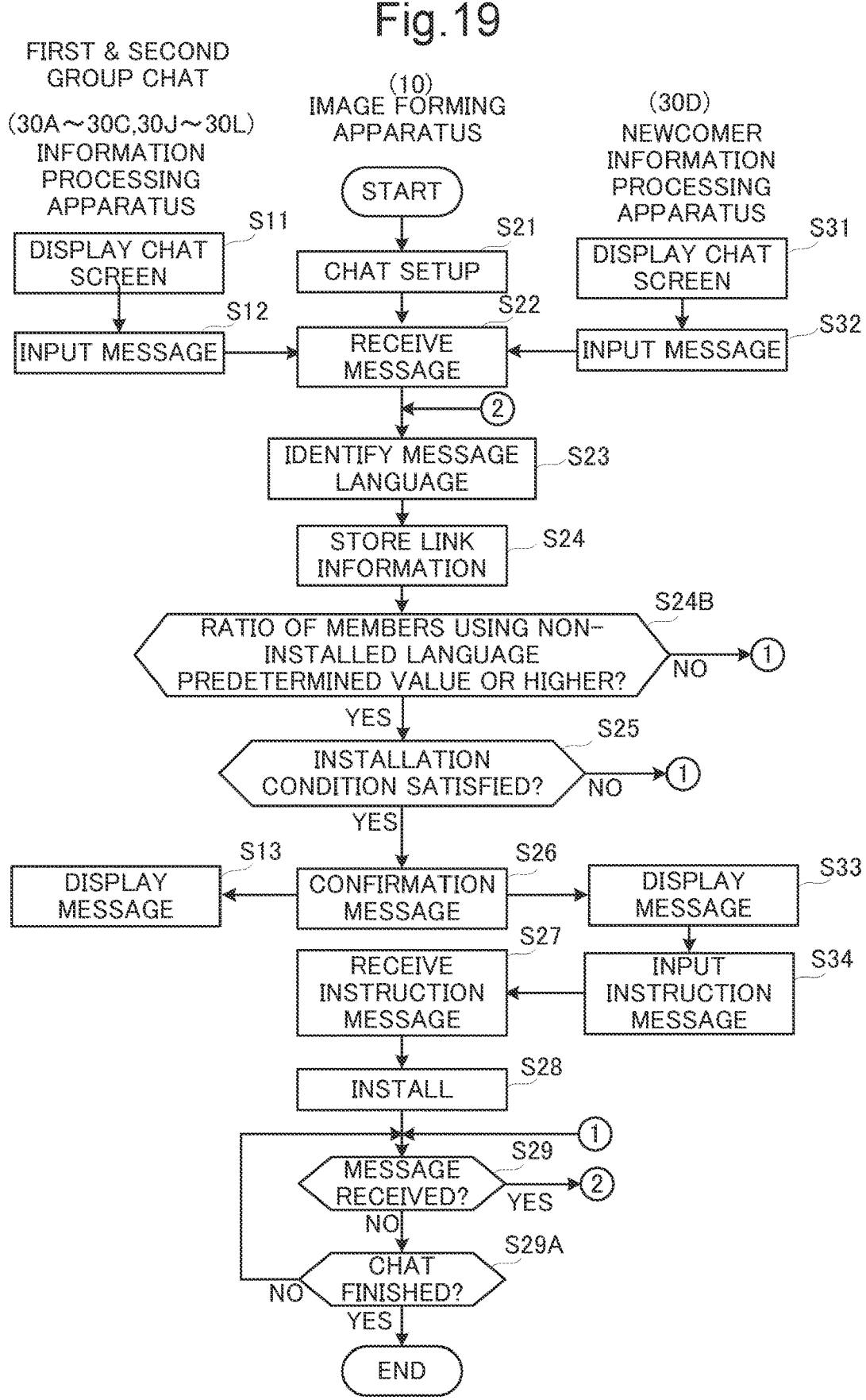
FIG. 19 is a flowchart showing a process of deleting a language, using the group chat function of the communication system according to a first variation of the third embodiment.

Hereunder, the communication system 1 according to a first variation of the third embodiment will be described, with reference to FIG. 19. FIG. 19 is a flowchart showing a process of deleting a language, using the group chat function of the communication system according to the first variation of the third embodiment.

The first variation of the third embodiment is different from the third embodiment, in that the predetermined installation condition is that the language of the message inputted to a specific chat, for example the first group chat GP1, from the information processing apparatus 30D, and identified by the language identification unit 23 (Chinese) is a non-installed language, and that a ratio of the number of members using the non-installed language in the specific chat is equal to or higher than a predetermined value. In other words, in the first variation of the third embodiment, S24A in FIG. 18 according to the third embodiment is substituted with S24B in FIG. 19, and such difference will be described in detail.

After S24, the controller 21 of the image forming apparatus 10 decides whether the ratio of the number of members using the non-installed language in the specific chat (in this example, first group chat GP1) is equal to or higher than a predetermined value (e.g., 10%) (S24B).

To be more detailed, the information that the specific chat is the first group chat GP1, and the predetermined ratio (e.g., 10%) are stored in advance in the storage device 19. The controller 21 decides that, since four information processing apparatuses 30 are participating in the specific chat (in this example, first group chat GP1), and the ratio of the number of members using the non-installed language in the first group chat GP1, namely the information processing apparatus 30D, is 25% (=1/4), the ratio is higher than the predetermined value (e.g., 10%) (YES at S24B). In the case where the ratio is lower than the predetermined value (e.g., 10%) (NO at S24B), the controller 21 proceeds to S29.

With the arrangement according to the first variation of the third embodiment, when the ratio of the number of members using the non-installed language in the specific chat is equal to or higher than the predetermined value, the non-installed language can be easily and quickly installed, as the language usable with the image forming apparatus 10. In addition, even though the scale of the specific chat varies, the language usable with the image forming apparatus 10 can be properly installed, in proportion to the scale of the specific chat.

Although the specific chat is exemplified by the first group chat GP1 in the first variation of the third embodiment, the specific chat may be exemplified by the second group chat GP2, or both of the first group chat GP1 and the second group chat GP2.

Here, in the first variation of the third embodiment, the predetermined installation condition may be specified such that the language of the message inputted to the first group chat GP1, from the information processing apparatus 30, is a non-installed language, not installed yet as the language identified by the language identification unit 23, and that the ratio of the number of members using the non-installed language in the first group chat GP1 is equal to or higher than a first predetermined value (e.g., 20%), or such that the language of the message inputted to the second group chat GP2, from the information processing apparatus 30, is a non-installed language, not installed yet as the language identified by the language identification unit 23, and that the ratio of the number of members using the non-installed language in the second group chat GP2 is equal to or higher than a second predetermined value (e.g., 10% or 50%), different from the first predetermined value (e.g., 20%). Such arrangements enable the non-installed language to be installed easily and quickly, as the language usable with the image forming apparatus 10. Further, the addition of the language usable with the image forming apparatus 10 can be handled in different ways between the first group chat GP1 and the second group chat GP2, and therefore the degree of priority in adding the language can be differently arranged, in the group chat. Here, the first predetermined value may be set to a desired value between 0% and 100%, without limitation to 20%, and the second predetermined value may also be set to a desired value between 0% and 100%, without limitation to 10% or 50%.

Figure 20:
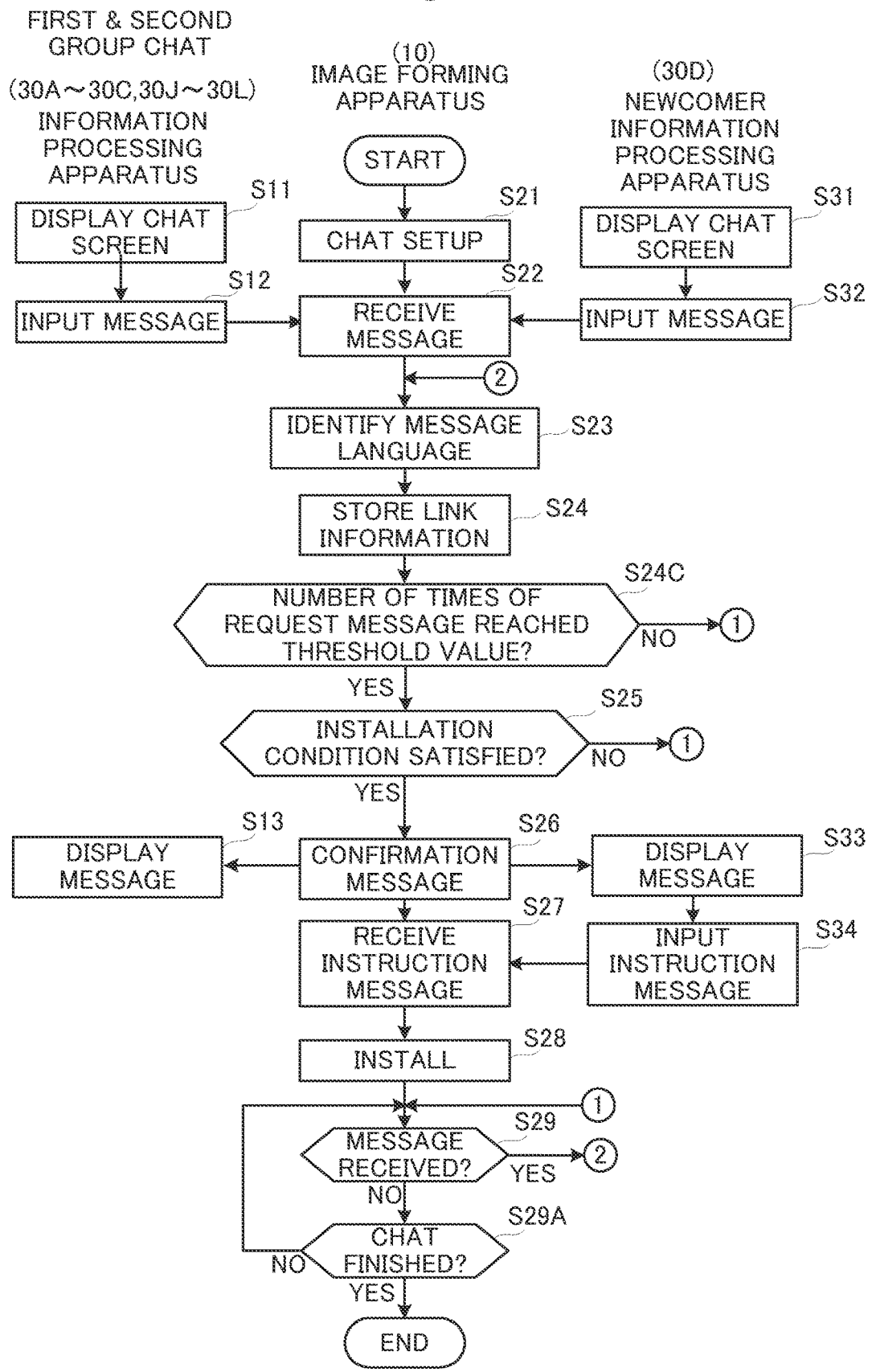
FIG. 20 is a flowchart showing a process of deleting a language, using the group chat function of the communication system according to a second variation of the third embodiment.

Hereunder, the communication system 1 according to a second variation of the third embodiment will be described, with reference to FIG. 20. FIG. 20 is a flowchart showing a process of deleting a language, using the group chat function of the communication system according to the second variation of the third embodiment.

The second variation of the third embodiment is different from the third embodiment, in that the predetermined installation condition is that the number of times that an installation request message from the information processing apparatus 30 for the non-installed language has been inputted to the first group chat GP1 or the second group chat GP2 reaches a predetermined threshold value (e.g., five times). In other words, in the second variation of the third embodiment, S24A in FIG. 18 according to the third embodiment is substituted with S24C in FIG. 20, and such difference will be described in detail. The threshold value (e.g., five times) is stored in advance in the storage device 19.

After S24, the controller 21 of the image forming apparatus 10 decides whether the number of times that the installation request message for the non-installed language has been received from the information processing apparatus 30 has reached the threshold value (e.g., five times) (S24C).

To be more detailed, upon deciding that the number of times that the installation request message for the non-installed language (e.g., Chinese) has been received from the information processing apparatus 30D is five times, in other words that the number of times has reached the threshold value (e.g., five times) (YES at S24C), the controller 21 proceeds to S25. In the case where the number of times is less than the threshold value (NO at S24C), the controller 21 proceeds to S29.

With the arrangement according to the second variation of the third embodiment, when the number of times that the installation request message for the non-installed language has been inputted to the first group chat GP1 or the second group chat GP2 reaches the threshold value, the non-installed language can be easily and quickly installed, as the language usable with the image forming apparatus 10.

Here, in the second variation of the third embodiment, the predetermined installation condition may be specified such that the number of times that the installation request message for the non-installed language has been inputted to the first group chat from the information processing apparatus reaches a first predetermined threshold value (e.g., twice), or that the number of times that the installation request message for the non-installed language has been inputted to the second group chat from the information processing apparatus reaches a second predetermined threshold value (e.g., five times) different from the first threshold value. Such arrangements enable the non-installed language to be installed easily and quickly, as the language usable with the image forming apparatus 10, when the number of times that the installation request message for the non-installed language has been inputted to the first group chat GP1 reaches the first threshold value, or when the number of times that the installation request message for the non-installed language has been inputted to the second group chat GP2 reaches the second threshold value. Further, the addition of the language usable with the image forming apparatus 10 can be handled in different ways between the first group chat GP1 and the second group chat GP2, and therefore the degree of priority in adding the language can be differently arranged, in the group chat.

Figure 21A:
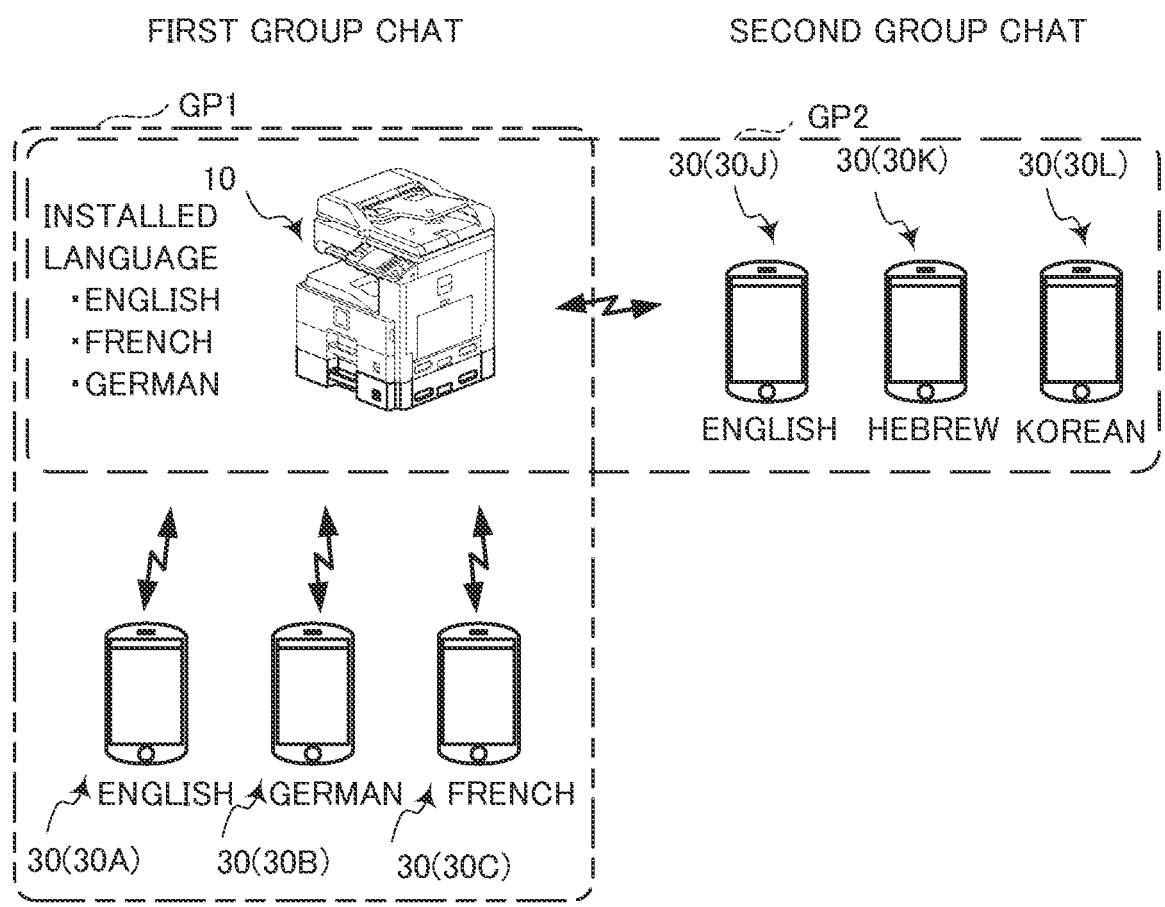
FIG. 21A is a schematic drawing showing a state where the first and the second group chat are being performed.
Figure 21B:
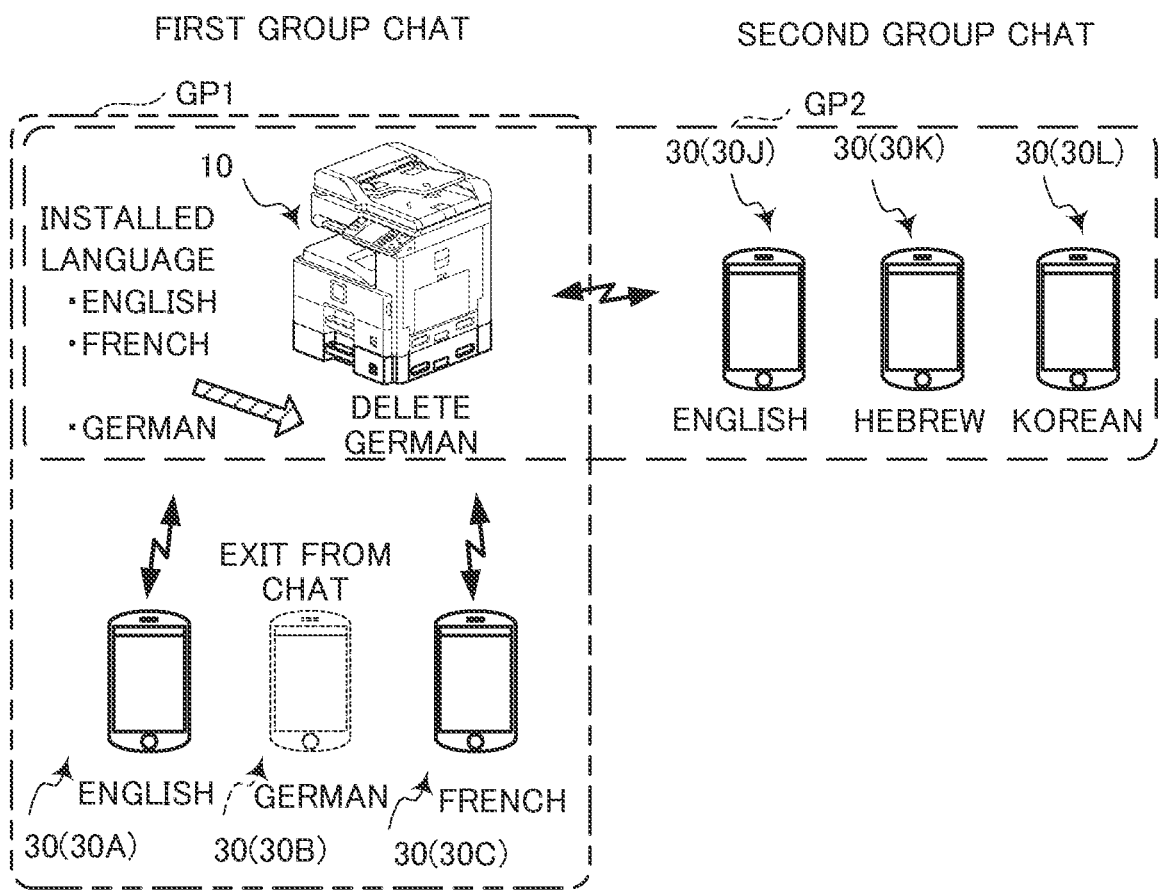
FIG. 21B is a schematic drawing showing a state where a language is deleted because of one of the information processing apparatuses of the first group chat exiting from the chat.

Hereunder, the communication system 1 according to a fourth embodiment will be described. FIG. 21A is a schematic drawing showing a state where the first and the second group chat are being performed. FIG. 21B is a schematic drawing showing a state where a language is deleted because of one of the information processing apparatuses of the first group chat exiting from the chat. FIG. 22 is a flowchart showing a process of deleting a language, using the group chat function of the communication system according to the fourth embodiment.

In the communication system 1 according to the fourth embodiment, as shown in FIG. 21A, the first group chat GP1 and the second group chat GP2 are formed. The first group chat GP1 includes the image forming apparatus 10 and three information processing apparatuses 30A, 30B, and 30C, as the members. The second group chat GP2 includes the image forming apparatus 10 and three information processing apparatuses 30J, 30K, and 30L as the members. The information processing apparatuses 30A and 30J use English, and the information processing apparatuses 30B, 30C, 30K, and 30L use German, French, Hebrew, and Korean, respectively.

Referring to FIG. 22, when the communication device 16 receives the exit information indicating that the information processing apparatus is exiting from the first group chat GP1, the controller 21 identifies the language (German) of the information processing apparatus (in this example, information processing apparatus 30B) that has outputted the exit information, on the basis of the link information in the storage device 19, and then decides whether the first group chat GP1, in which the information processing apparatus 30B is participating, is the deciding group (S43A). The controller 21 decides that the first group chat GP1 is the deciding group, on the basis of the group information stored in the storage device 19, as in the third embodiment (YES at S43A).

In the case where the controller 21 decides that no other information processing apparatus is using the language (German) of the information processing apparatus 30B that has outputted the exit information in the first group chat GP1 (YES at S44), as shown in FIG. 21B, the controller 21 uninstalls the language (German) of the information processing apparatus 30B that has outputted the exit information, as the unused language (S45). In the case where the information processing apparatus 30B is participating in the second group chat GP2 (NO at S43A), the controller 21 proceeds to S46. In other words, the controller 21 does not uninstall the language of the information processing apparatus 30 that has outputted the exit information, despite the communication device 16 having received the exit information inputted to the second group chat GP2, indicating that the information processing apparatus 30 is exiting from the second group chat.

With the arrangement according to the fourth embodiment, the deletion of the language usable with the image forming apparatus 10 can be handled in different ways between the first group chat GP1 and the second group chat GP2, and therefore the degree of priority in deleting the language can be differently arranged, in the group chat.

Here, although the deletion of the language usable with the image forming apparatus 10 is handled in different ways between the first group chat GP1 and the second group chat GP2, in the fourth embodiment, the language may be deleted in the same way. For example, the language of the information processing apparatus 30 that has outputted the exit information may be uninstalled as the unused language, when it is decided that no other information processing apparatus is using the language of the information processing apparatus 30 that has outputted the exit information, in either of the first group chat GP1 and the second group chat GP2. In other words, the language of the member who has exited from the group chat may be uninstalled, when no other information processing apparatus is using the language of the member who has exited. Such an arrangement enables the language no longer used in the group chat to be properly deleted without time and labor, from the languages usable with the image forming apparatus 10. Consequently, the languages usable with the image forming apparatus can be properly prepared, in accordance with the languages of the members participating in the group chat.

Figure 23:
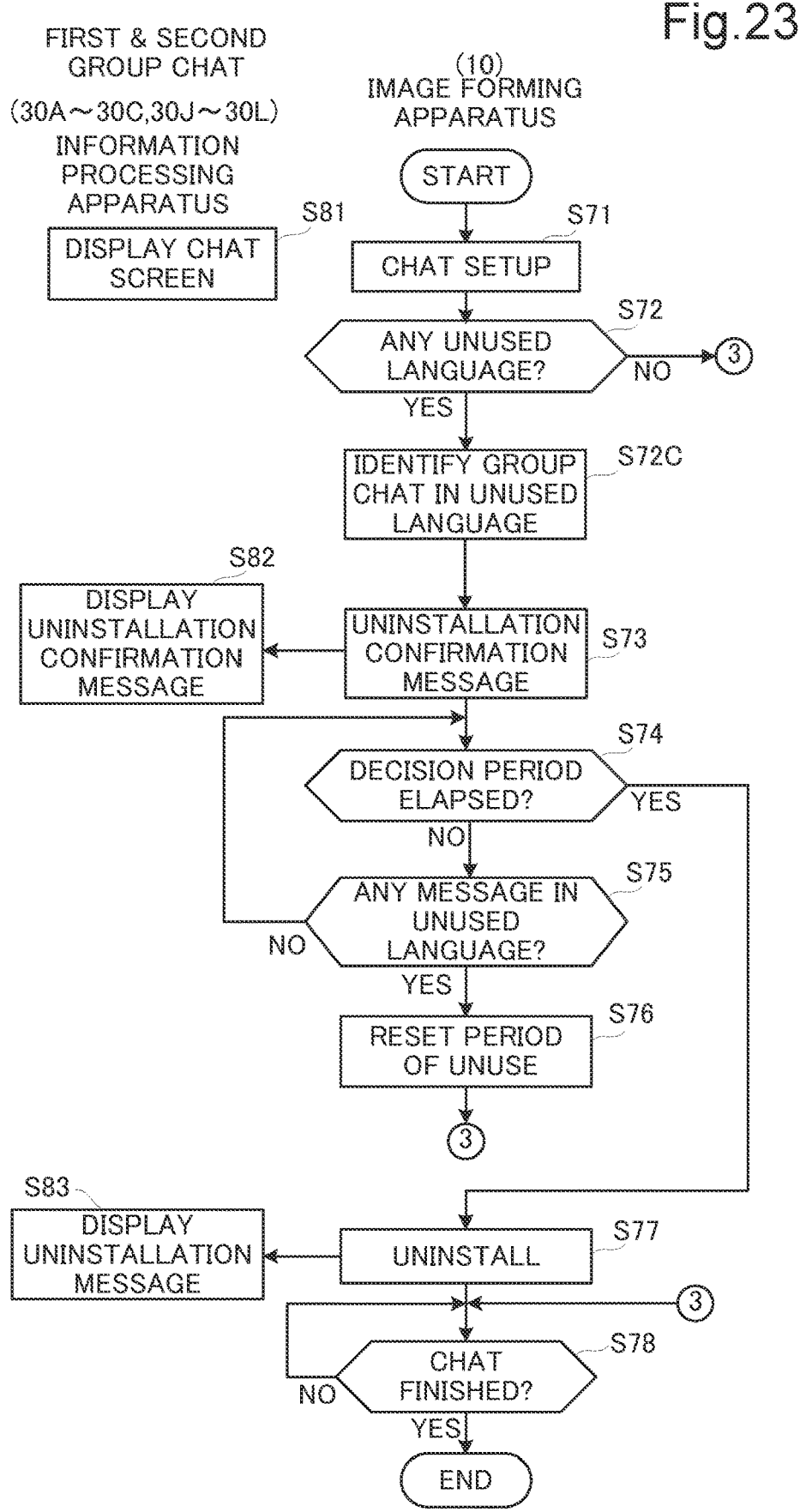
FIG. 23 is a flowchart showing a process of deleting a language, using the group chat function of the communication system according to a first variation of the fourth embodiment.

Hereunder, the communication system 1 according to a first variation of the fourth embodiment will be described, with reference to FIG. 23. FIG. 23 is a flowchart showing a process of deleting a language, using the group chat function of the communication system according to the first variation of the fourth embodiment.

The first variation of the fourth embodiment is different from the second embodiment, in identifying the group chat of the unused language, transmitting the uninstallation confirmation message to the user of the identified group chat, and uninstalling the unused language, after confirming the unuse. FIG. 23 is different from FIG. 10 in additionally including S72C, and such difference will be described in detail.

Referring to FIG. 23, upon deciding that one of the languages is unused (YES at S72), the controller 21 identifies the group chat of the unused language, on the basis of the link information stored in the storage device 19 (S72C). Then the controller 21 generates the uninstallation confirmation message in the unused language, and causes the communication device 16 to transmit the generated uninstallation confirmation message, to the information processing apparatuses 30 currently participating in the group chat of the unused language (S73).

With the arrangement according to the first variation of the fourth embodiment, the user is requested to confirm whether the unused language may be uninstalled, and the unused language is uninstalled, when no message in the unused language is received from the user. Therefore, the languages usable with the image forming apparatus 10 can be prepared in accordance with the intention of the user.

Here, although the uninstallation confirmation message is transmitted in the unused language, to the information processing apparatuses 30 currently participating in the group chat of the unused language, in the first variation of the fourth embodiment, the unused language may be immediately uninstalled, without transmitting the uninstallation confirmation message. In this case also, the unused language that is no longer used in the first group chat GP1 or the second group chat GP2 can be excluded from the languages usable with the image forming apparatus 10. In other words, only the languages actually used in the first group chat GP1 or the second group chat GP2 are kept installed as the languages usable with the image forming apparatus 10. Therefore, the languages usable with the image forming apparatus 10 can be properly prepared, in accordance with the languages being used in the group chat.

Although the image forming apparatus 10 and the information processing apparatuses 30 activate the chat function in collaboration with each other in the foregoing embodiments and variations thereof, a management server may activate the chat function. Two or more of the foregoing embodiments may be combined. Further, at least one of the variations may be combined with one or more of the embodiments.

Further, the configurations and processings described in the foregoing embodiments with reference to FIG. 1 to FIG. 23 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus including an image forming device that forms an image on a recording medium, the image forming apparatus comprising:
    a communication device that performs data communication;
    a storage device containing a plurality of predetermined language data; and
    a first control device including a processor, and configured to act, when the processor executes a control program, as;
        a setup unit that establishes, by activating a group chat tool, a condition that enables group chat to be performed, among members including the image forming apparatus and a plurality of information processing apparatuses;
        a language identification unit that identifies, when the communication device receives a message inputted to the group chat from the information processing apparatus, a language of the message; and
        a controller that installs the language indicated by the language data retrieved from the storage device, as a language usable with the image forming apparatus,
    wherein, when the language identified by the language identification unit is not installed, the controller retrieves the language data indicating the identified language from the storage device, and installs the identified language as a language usable with the image forming apparatus.

2. The image forming apparatus according to claim 1,
    wherein the controller causes the communication device, when the language identified by the language identification unit is not installed, to output an installation confirmation message in the identified language, asking whether the language identified by the language identification unit may be installed, to the group chat, and
    the controller retrieves the language data indicating the identified language from the storage device, when the communication device receives an installation instruction message in the identified language inputted to the group chat, and installs the identified language as the language usable with the image forming apparatus.

3. The image forming apparatus according to claim 1,
    wherein, when the language identification unit identifies the language of the message, the controller stores link information in which the identified language and the information processing apparatus that has outputted the message are associated with each other, in the storage device, and the controller identifies, when the communication device receives exit information indicating that the information processing apparatus is exiting from the group chat, the language of the information processing apparatus that has outputted the exit information, according to the link information in the storage device, and uninstalls the language of the information processing apparatus that has outputted the exit information as an unused language, upon deciding that no other information processing apparatus is using the language of the information processing apparatus that has outputted the exit information.

4. The image forming apparatus according to claim 1, wherein, when the language identification unit identifies the language of the message, the controller stores link information in which the identified language, the information processing apparatus that has outputted the message, and a time that the message was received are associated with each other, in the storage device, and upon deciding that one of the languages used in the group chat has been unused for a predetermined period, using the link information stored in the storage device, the controller uninstalls the unused language.

5. The image forming apparatus according to claim 4, wherein the controller causes the communication device, upon deciding that one of the languages used in the group chat has been unused for a predetermined period, using the link information stored in the storage device, to output an uninstallation confirmation message in the unused language asking whether the unused language may be uninstalled, to the group chat, and the controller uninstalls the unused language, when no message in the unused language is received within a predetermined decision period after the uninstallation confirmation message is inputted to the group chat.

6. The image forming apparatus according to claim 3, wherein the storage device contains, in advance, a threshold value of a number of the languages usable with the image forming apparatus, and the controller keeps from uninstalling the unused language, when the number of the languages usable with the image forming apparatus is fewer than the threshold value, and uninstalls the unused language when the number of the languages usable with the image forming apparatus is equal to or larger than the threshold value.

7. The image forming apparatus according to claim 3, wherein the storage device contains, in advance, regional language information in which a predetermined installation region of the image forming apparatus and a main language in the installation region are associated with each other, and installation information indicating the installation region of the image forming apparatus, and the controller identifies the main language in the installation region, using the regional language information and the installation information stored in the storage device, and keeps from uninstalling the unused language when the unused language is the main language, but uninstalls the unused language when the unused language is not the main language.

8. The image forming apparatus according to claim 1, wherein the storage device contains, in advance, a predetermined lower limit of a ratio of a number of the information processing apparatuses using an object language, to a total number of the information processing apparatuses participating in the group chat, and the controller uninstalls the object language, when the ratio of the number of the information processing apparatuses using the object language in the group chat is lower than the predetermined lower limit.

9. A communication system comprising:

an image forming apparatus; and a plurality of information processing apparatuses, the image forming apparatus and the plurality of information processing apparatuses being configured to perform data communication with each other via a network, wherein the plurality of information processing apparatuses each include:

a display device;

an operation device to be operated by a user;

a first communication device that performs data communication; and a first control device including a processor, and configured to act, when the processor executes a control program, as:

a first setup unit that establishes a condition that enables group chat to be performed, by activating a group chat tool, and causes the display device to display a group chat screen; and a first controller that causes the first communication device, when a message is inputted to the group chat screen through the operation device, to transmit the message to the image forming apparatus, via a network, and the image forming apparatus includes:

an image forming device that forms an image on a recording medium;

a second communication device that performs data communication;

a storage device containing a plurality of predetermined language data; and a second control device including a processor, and configured to act, when the processor executes a second control program, as:

a second setup unit that establishes a condition that enables group chat to be performed, by activating a group chat tool;

a language identification unit that identifies, when the second communication device receives the message from the plurality of information processing apparatuses, a language of the message; and a second controller that installs the language indicated by the language data retrieved from the storage device, as a language usable with the image forming apparatus, and when the language identified by the language identification unit is not installed, the second controller retrieves language data indicating the identified language from the storage device, and installs the identified language as a language usable with the image forming apparatus.

10. The image forming apparatus according to claim 1, wherein the setup unit establishes, by activating the group chat tool, a condition that enables a first group chat and a second group chat to be performed among members including the image forming apparatus and a plurality of information processing apparatuses, the language identification unit identifies, when the communication device receives a message inputted to the first group chat or the second group chat from the information processing apparatus, a language of the message, and the controller retrieves the language data indicating the language identified by the language identification unit from the storage device, when a predetermined installation condition is satisfied, and installs the identified language as the language usable with the image forming apparatus.

11. The image forming apparatus according to claim 10, wherein the predetermined installation condition is that the language of the message inputted to the first group chat or the second group chat from the information processing apparatus is not installed as the language identified by the language identification unit.

12. The image forming apparatus according to claim 10, wherein the storage device contains, in advance, group information indicating that the first group chat is a deciding group that can decide whether a language may be added, and that the second group chat is a non-deciding group unable to decide whether a language may be added, the predetermined installation condition is that the language of the message from the information processing apparatus inputted to the first group chat, and identified by the language identification unit, is not installed, and upon deciding that the predetermined installation condition is satisfied, using the group information stored in the storage device, the controller retrieves the language data indicating the language identified by the language identification unit from the storage device, and installs the identified language as the language usable with the image forming apparatus.

13. The image forming apparatus according to claim 10, wherein the predetermined installation condition is that the language of the message from the information processing apparatus, inputted to the first group chat, the second group chat, or both of the first group chat and the second group chat is a non-installed language not installed as the language identified by the language identification unit, and that a ratio of a number of members using the non-installed language in the specific chat is equal to or higher than a predetermined value.

14. The image forming apparatus according to claim 10, wherein the predetermined installation condition is (i) that the language of the message inputted to the first group chat from the information processing apparatus is a non-installed language, not installed as the language identified by the language identification unit, and that a ratio of a number of members using the non-installed language in the first group chat is equal to or higher than a first predetermined value, or (ii) that the language of the message inputted to the second group chat from the information processing apparatus is a non-installed language, not installed as the language identified by the language identification unit, and that the ratio of the number of members using the non-installed language in the second group chat is equal to or higher than a second predetermined value different from the first predetermined value.

15. The image forming apparatus according to claim 10, wherein the predetermined installation condition is that a number of times that an installation request message from the information processing apparatus for a non-installed language has been inputted to the first group chat or the second group chat reaches a threshold value.

16. The image forming apparatus according to claim 10, wherein the predetermined installation condition is that a number of times that an installation request message from the information processing apparatus for a non-installed language has been inputted to the first group chat reaches a first threshold value, or that a number of times that the installation request message from the information processing apparatus for the non-installed language has been inputted to the second group chat reaches a second threshold value different from the first threshold value.

17. The image forming apparatus according to claim 10, wherein the controller stores, when the language identification unit identifies the language of the message, link information in which the identified language and the information processing apparatus that has outputted the message are associated with each other, in the storage device, and the controller identifies, when the communication device receives exit information from the information processing apparatus of the first group chat or the second group chat, indicating that the information processing apparatus is exiting from the group chat, the language of the information processing apparatus that has outputted the exit information, using the link information in the storage device, and uninstalls, upon deciding that no other information processing apparatus is using the language of the information processing apparatus that has outputted the exit information, in either of the first group chat and the second group chat from which the exit information has been outputted, the language of the information processing apparatus that has outputted the exit information, as an unused language.

18. The image forming apparatus according to claim 12, wherein the controller (i) identifies, when the communication device receives exit information indicating that the information processing apparatus is exiting from the first group chat, the language of the information processing apparatus that has outputted the exit information, using the link information in the storage device, (ii) uninstalls, upon deciding that no other information processing apparatus is using the language of the information processing apparatus that has outputted the exit information, in the first group chat, the language of the information processing apparatus that has outputted the exit information, as an unused language, and (iii) keeps from uninstalling the language of the information processing apparatus that has outputted the exit information, despite the communication device having received the exit information from the information processing apparatus inputted to the second group chat, indicating that the information processing apparatus is exiting from the second group chat.

19. The image forming apparatus according to claim 10, wherein the controller stores, when the language identification unit identifies the language of the message, link information in which the identified language, the information processing apparatus that has outputted the message, and a time that the message was received are associated with each other, in the storage device, and upon deciding that one of the languages used in the first group chat or the second group chat has been unused for a predetermined period, using the link information stored in the storage device, the controller uninstalls the unused language.

20. The image forming apparatus according to claim 19, wherein the controller causes the communication device, upon deciding that one of the languages used in the group chat has been unused for a predetermined period, using the link information stored in the storage device, to output an uninstallation confirmation message in the unused language asking whether the unused language may be uninstalled, to one of the first group chat and the second group chat in which the unused language has been used, and the controller uninstalls the unused language, when no message in the unused language is received within a predetermined decision period after the uninstallation confirmation message is inputted to the group chat.

\* \* \* \* \*